United States Patent [19]
Foster

[11] Patent Number: 5,911,555
[45] Date of Patent: Jun. 15, 1999

[54] VEHICLE/DOCK LOADING/UNLOADING CONVEYOR SYSTEM

[76] Inventor: Raymond Keith Foster, 401 NW. Alder, Madras, Oreg. 97741

[21] Appl. No.: 09/076,505

[22] Filed: May 12, 1998

[51] Int. Cl.[6] .................................................. B65B 25/00
[52] U.S. Cl. .......................... 414/398; 198/583; 198/614; 414/525.1
[58] Field of Search .................................. 414/398, 345, 414/525.9, 502, 525.1; 198/614, 750.5, 750.6, 583

[56] References Cited

U.S. PATENT DOCUMENTS

| | | | |
|---|---|---|---|
| 868,719 | 10/1907 | Stephens | 74/527 |
| 1,271,676 | 9/1918 | Denman | 74/534 |
| 1,883,493 | 10/1932 | Berg | 414/398 X |
| 2,050,518 | 8/1936 | Baumgardner | 280/33.44 |
| 2,064,615 | 12/1936 | Kuchar | 280/33.44 |
| 2,422,910 | 6/1947 | Katinos | 414/398 |
| 2,489,869 | 11/1949 | Dunn | 214/38 |
| 2,563,427 | 8/1951 | Scott | 198/583 |
| 2,565,072 | 8/1951 | French | 214/38 |
| 2,637,454 | 5/1953 | Rowe | 214/38 |
| 2,649,217 | 8/1953 | Mertes | 214/350 |
| 2,693,284 | 11/1954 | Gerhardt | 214/38 |
| 2,714,735 | 8/1955 | Watson | 14/71 |
| 2,945,396 | 7/1960 | Stultz, Jr. | 74/533 |
| 3,250,408 | 5/1966 | Daniluk et al. | 214/38 |
| 3,368,229 | 2/1968 | Pfleger | 14/71 |
| 3,397,802 | 8/1968 | Hinchee | 214/38 |
| 3,400,525 | 9/1968 | Snavely | 56/214 |
| 3,400,949 | 9/1968 | Kendall | 280/490 |
| 3,646,627 | 3/1972 | Potter | 14/71 |
| 3,692,330 | 9/1972 | Kendall | 280/402 |
| 3,699,601 | 10/1972 | Hecker, Jr. et al. | 14/71 |
| 3,708,183 | 1/1973 | Jones | 280/483 |
| 3,865,406 | 2/1975 | Dutton | 280/490 |
| 3,871,534 | 3/1975 | Bursk | 214/83.3 |
| 3,922,006 | 11/1975 | Borges | 280/415 |
| 3,961,714 | 6/1976 | Buehler | 214/41 |
| 4,002,353 | 1/1977 | Sysyn | 280/490 |
| 4,076,273 | 2/1978 | Campion | 280/490 |
| 4,127,856 | 11/1978 | Bickel | 340/687 |
| 4,137,587 | 2/1979 | Rosengren | 14/71.3 |
| 4,148,498 | 4/1979 | Taylor, Jr. | 280/482 |
| 4,208,161 | 6/1980 | Hipp et al. | 414/401 |
| 4,261,682 | 4/1981 | Papps et al. | 414/528 |
| 4,264,259 | 4/1981 | Hipp | 414/401 |
| 4,267,748 | 5/1981 | Grunewald et al. | 74/529 |
| 4,373,847 | 2/1983 | Hipp et al. | 414/401 |
| 4,589,813 | 5/1986 | Hagen et al. | 414/401 |
| 4,674,941 | 6/1987 | Hageman | 414/401 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |

(List continued on next page.)

FOREIGN PATENT DOCUMENTS 2 588 807  10/1985  France .
24 52 648  6/1975  Germany .

*Primary Examiner*—David A. Bucci
*Assistant Examiner*—Gerald J. O'Connor
*Attorney, Agent, or Firm*—Delbert J. Barnard

[57] ABSTRACT

A power driven, reciprocating slat conveyor (12) is provided on a dock (D). A passive, reciprocating slat conveyor (10) is provided within a trailer (T). The power driven conveyor (12) is coupled to the passive conveyor (10) so that the drive mechanism of the power driven conveyor (12) can be used to operate both conveyors (10, 12) in conjunction. All of the conveyor slats (14) of the dock conveyor (12) can be directly connected to corresponding conveyor slats (16) of the trailer conveyor (10). Or, one conveyor slat (14) from each set of conveyor slats in the power driven conveyor (12) can be connected to a corresponding conveyor slat in the passive conveyor (10) and these conveyor slats in the passive conveyor (10) can each be connected to a transverse drive beam which is connected to the remaining conveyor slats of the same set of conveyor slats. Or, the drive units of the powered conveyor (12) can be coupled to transverse drive beams which are connected to the sets of slats in the passive conveyor (10).

17 Claims, 17 Drawing Sheets

5,911,555
Page 2

U.S. PATENT DOCUMENTS

| | | | |
|---|---|---|---|
| 4,765,792 | 8/1988 | Cherry et al. | 414/401 |
| 4,821,868 | 4/1989 | Foster | 198/750 |
| 4,832,559 | 5/1989 | Gebbardt | 414/398 X |
| 4,861,217 | 8/1989 | Erlandsson | 414/401 |
| 4,915,568 | 4/1990 | West | 414/401 |
| 4,925,009 | 5/1990 | Hill | 198/583 |
| 4,936,731 | 6/1990 | Noble | 414/401 |
| 4,938,647 | 7/1990 | Erlandsson | 414/401 |
| 4,940,378 | 7/1990 | Feldmann et al. | 414/401 |
| 4,940,379 | 7/1990 | Staege | 414/401 |
| 4,946,330 | 8/1990 | Pedersen et al. | 414/401 |
| 4,964,777 | 10/1990 | Kleynjans et al. | 414/401 |
| 4,966,275 | 10/1990 | Hallstrom | 414/525.1 X |
| 4,969,792 | 11/1990 | Ellis et al. | 414/401 |
| 4,973,213 | 11/1990 | Erlandsson | 414/401 |
| 5,000,647 | 3/1991 | Foster | 414/525.9 |
| 5,026,242 | 6/1991 | Alexander | 414/401 |
| 5,054,987 | 10/1991 | Thornton | 414/390 |
| 5,071,306 | 12/1991 | Alexander | 414/401 |
| 5,096,359 | 3/1992 | Alexander | 414/401 |
| 5,120,181 | 6/1992 | Alexander | 414/401 |
| 5,165,524 | 11/1992 | Foster | 198/750 |
| 5,186,596 | 2/1993 | Boucher et al. | 414/398 X |
| 5,203,663 | 4/1993 | Ruppe | 414/401 |
| 5,212,846 | 5/1993 | Hahn | 14/69.5 |
| 5,249,905 | 10/1993 | Warner et al. | 414/401 |
| 5,259,718 | 11/1993 | Alexander | 414/401 |
| 5,297,921 | 3/1994 | Springer et al. | 414/401 |
| 5,332,081 | 7/1994 | Quaeck | 414/525.1 X |
| 5,336,033 | 8/1994 | Alexander | 414/401 |
| 5,346,353 | 9/1994 | Alexander | 414/401 |
| 5,348,437 | 9/1994 | Krupke et al. | 414/401 |
| 5,355,995 | 10/1994 | Foster | 414/525.1 X |
| 5,374,154 | 12/1994 | Alten | 414/537 |
| 5,388,947 | 2/1995 | Ancel et al. | 414/401 |
| 5,454,682 | 10/1995 | Alexander | 414/401 |
| 5,457,838 | 10/1995 | Gelder et al. | 14/69.5 |
| 5,487,462 | 1/1996 | Gilmore | 198/594 |
| 5,544,739 | 8/1996 | Christiaens et al. | 198/750 |
| 5,588,522 | 12/1996 | Foster et al. | 414/525.1 X |
| 5,645,390 | 7/1997 | Filiberti et al. | 414/390 |
| 5,664,929 | 9/1997 | Esaki et al. | 414/398 |
| 5,664,930 | 9/1997 | Ellis | 414/401 |

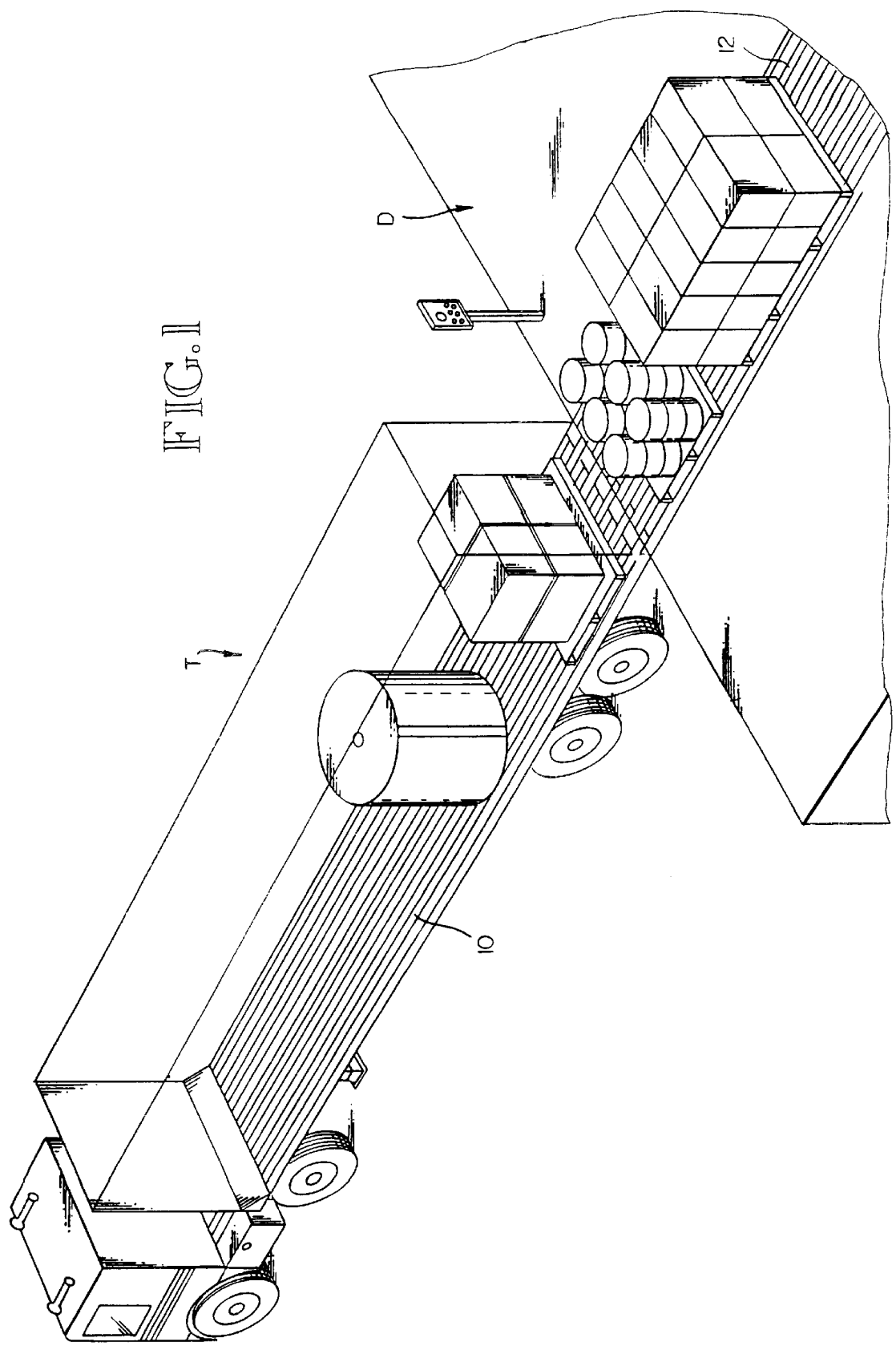

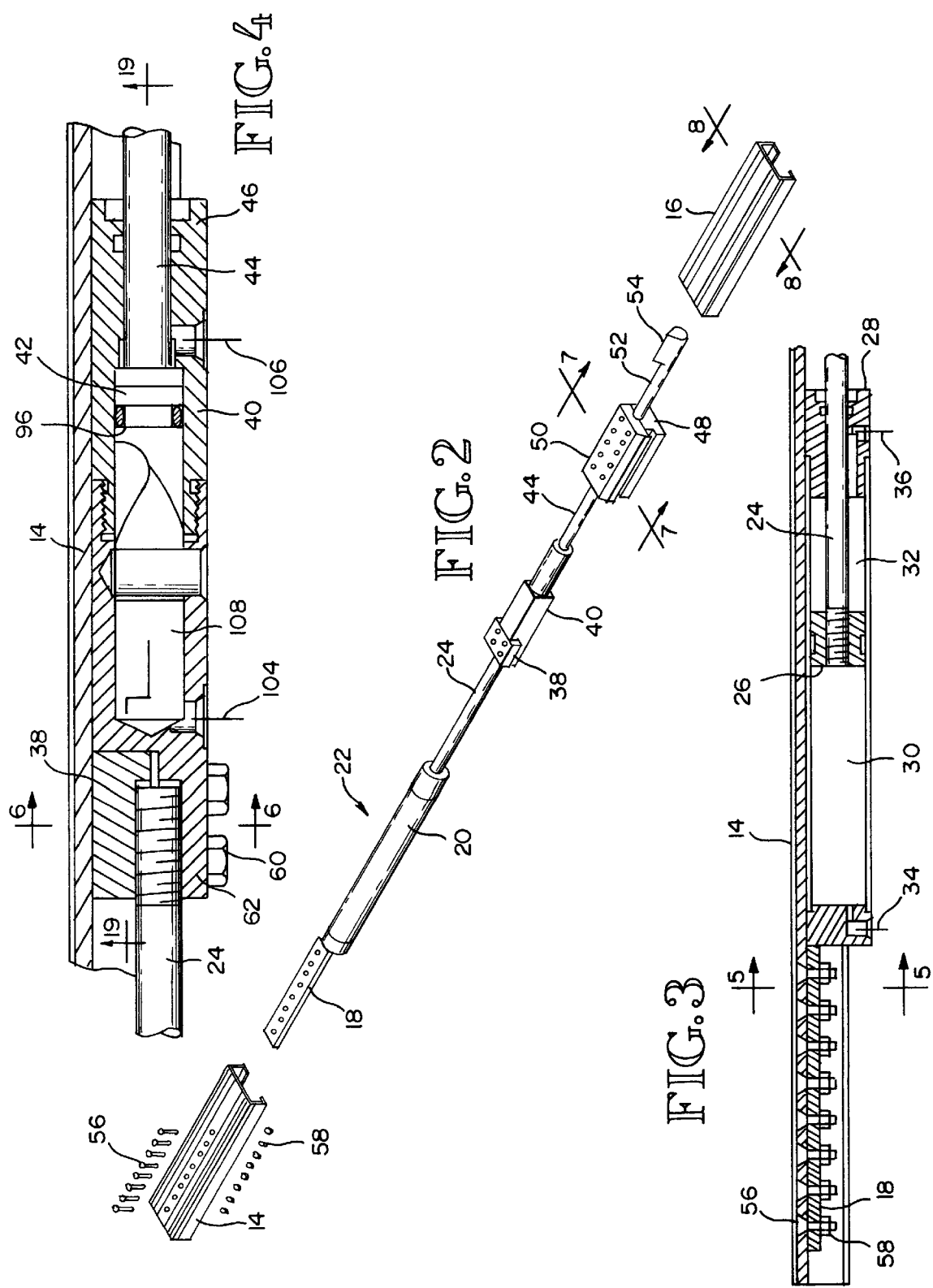

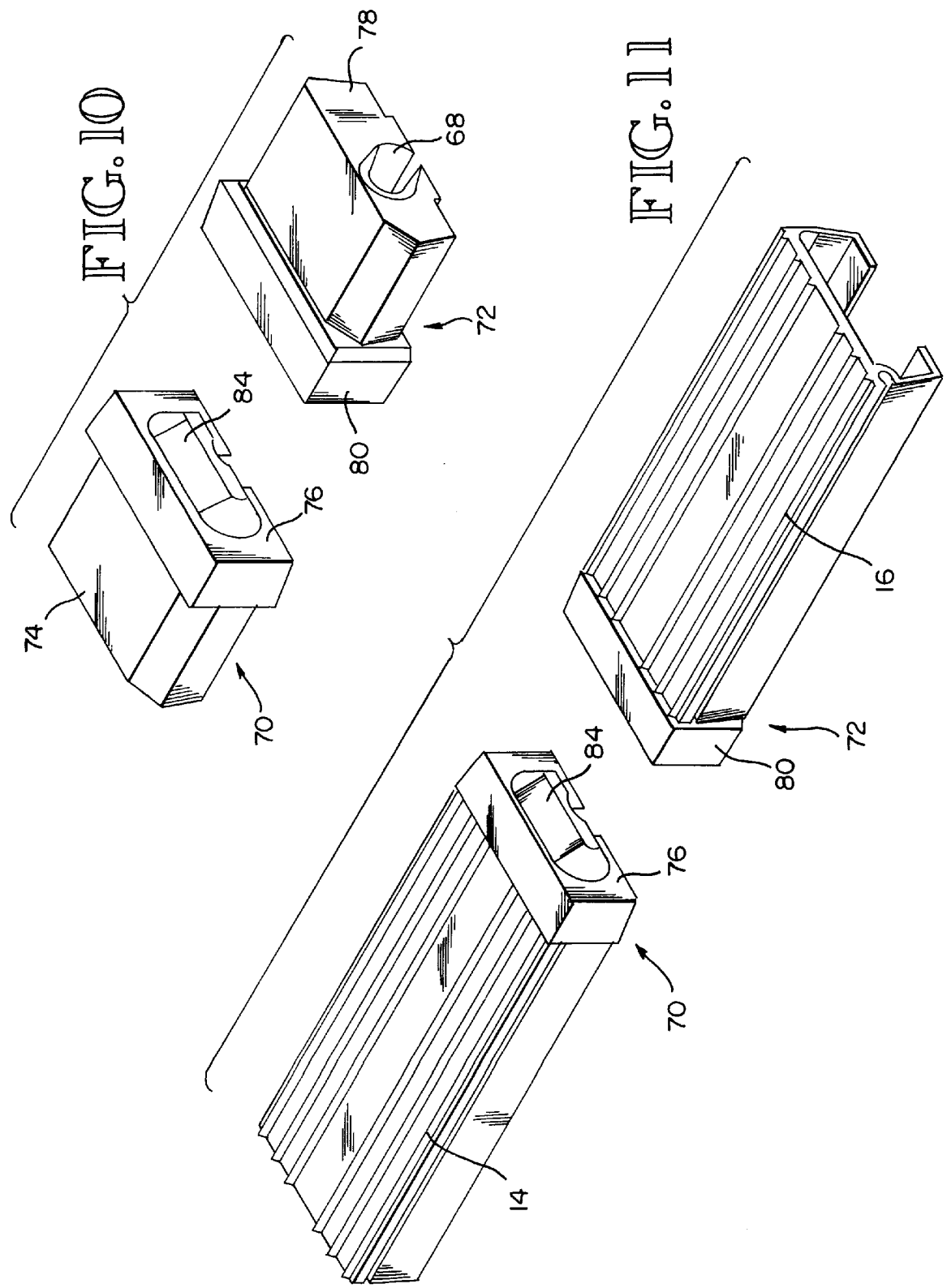

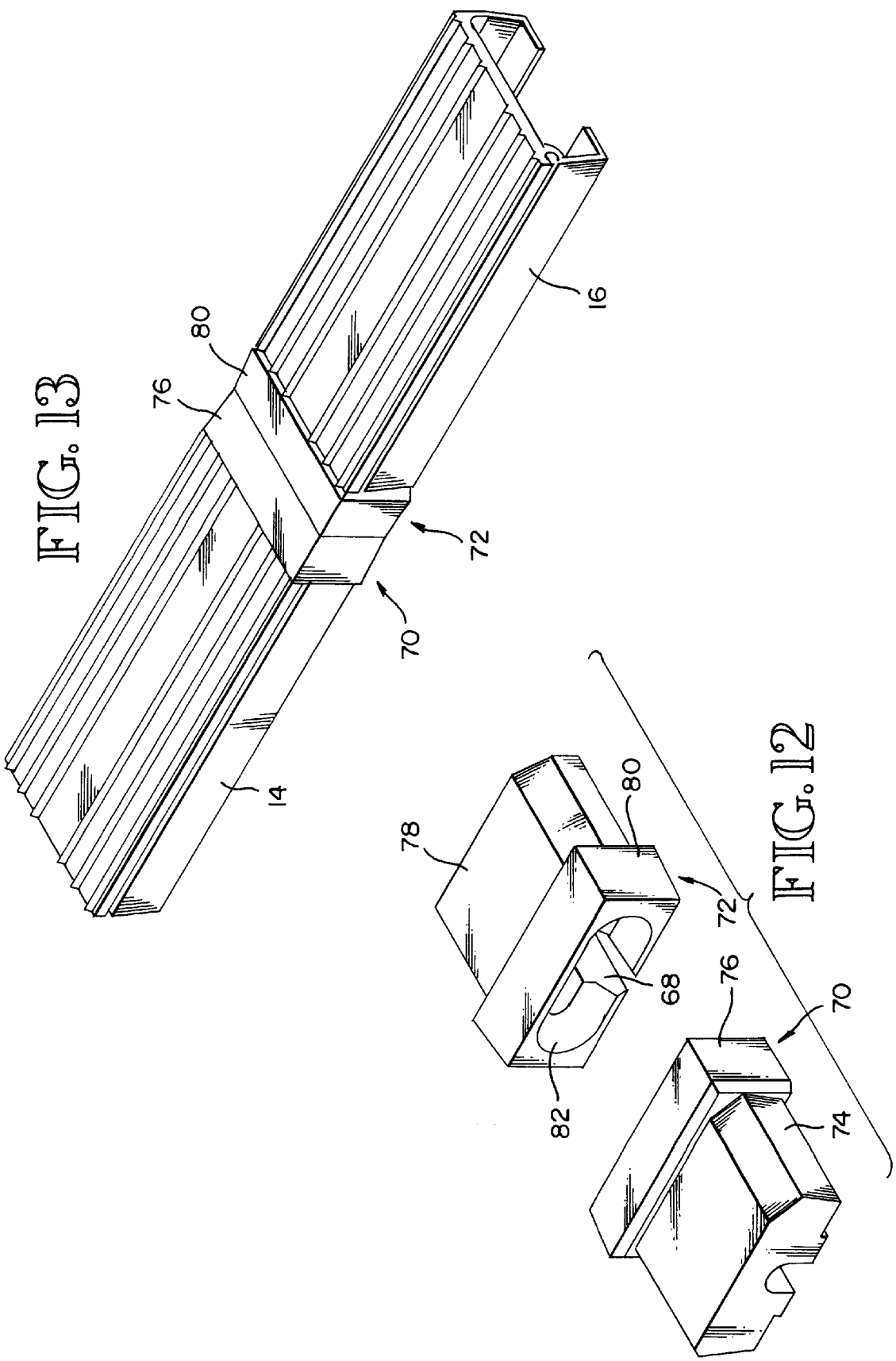

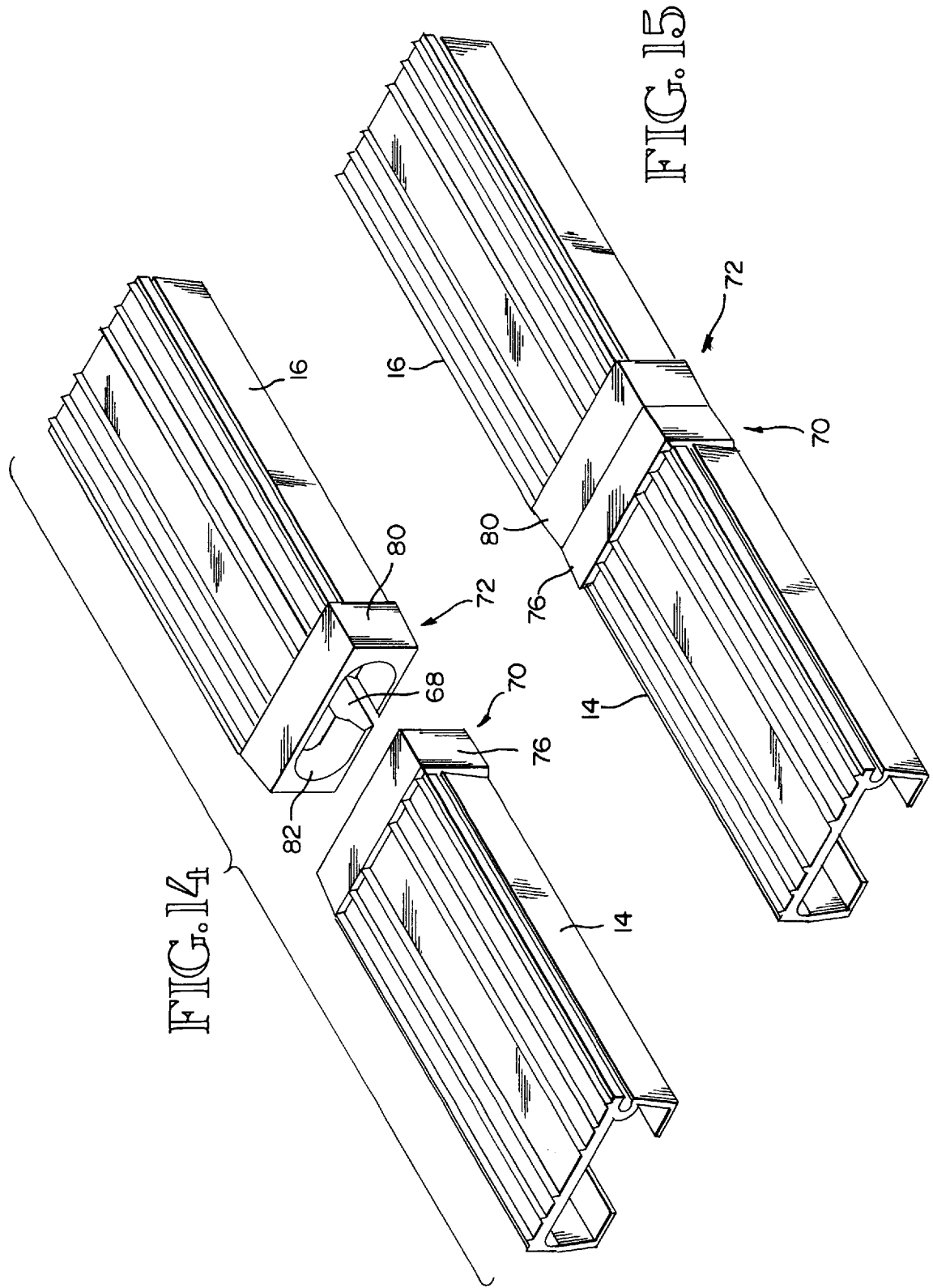

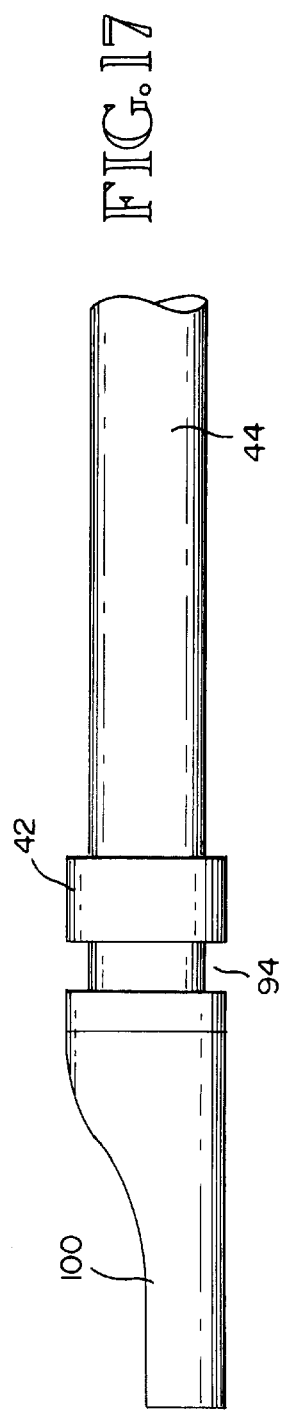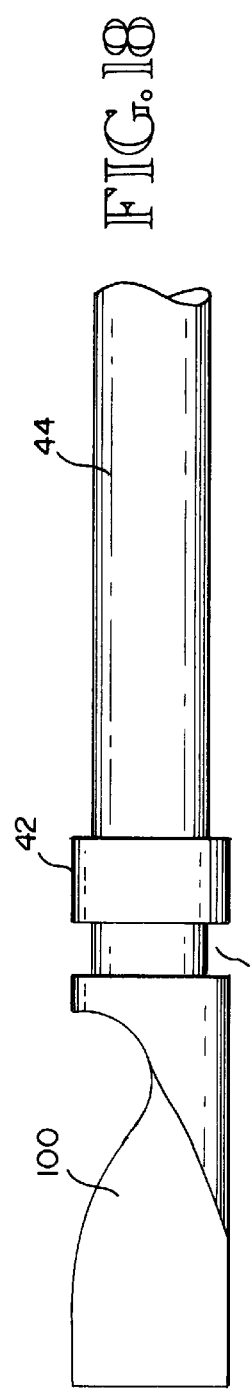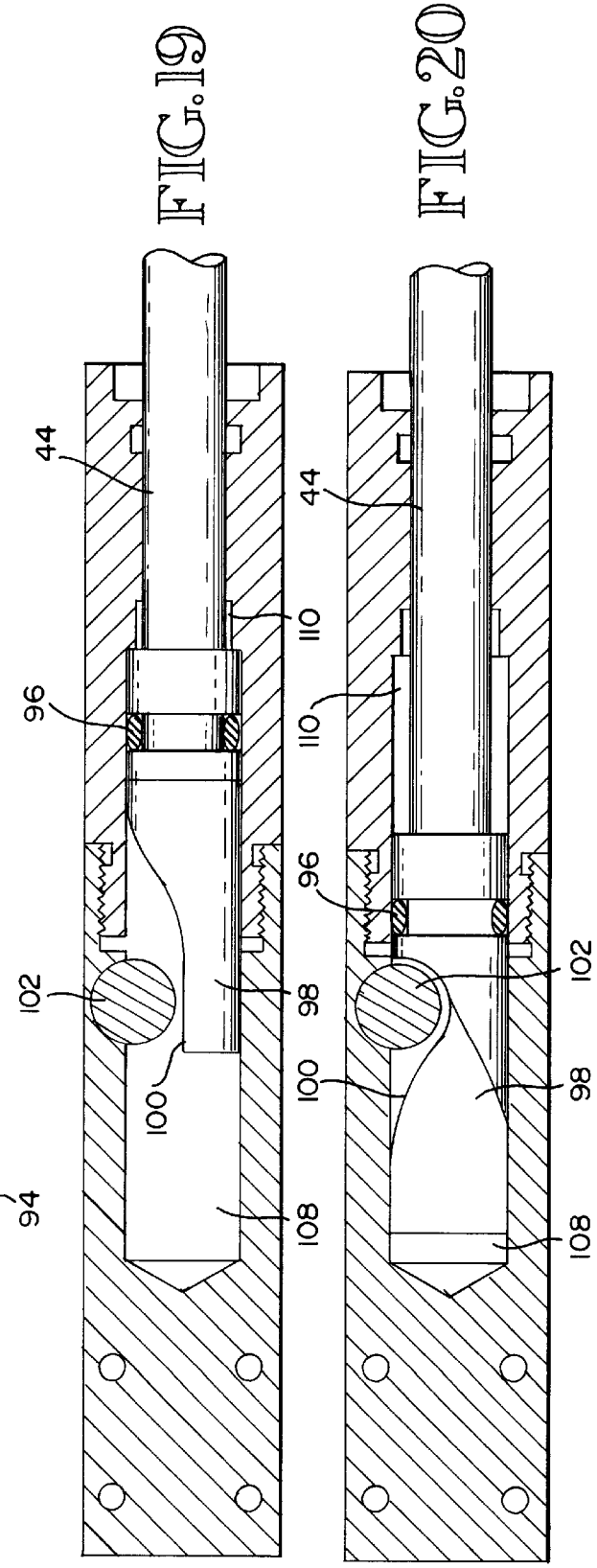

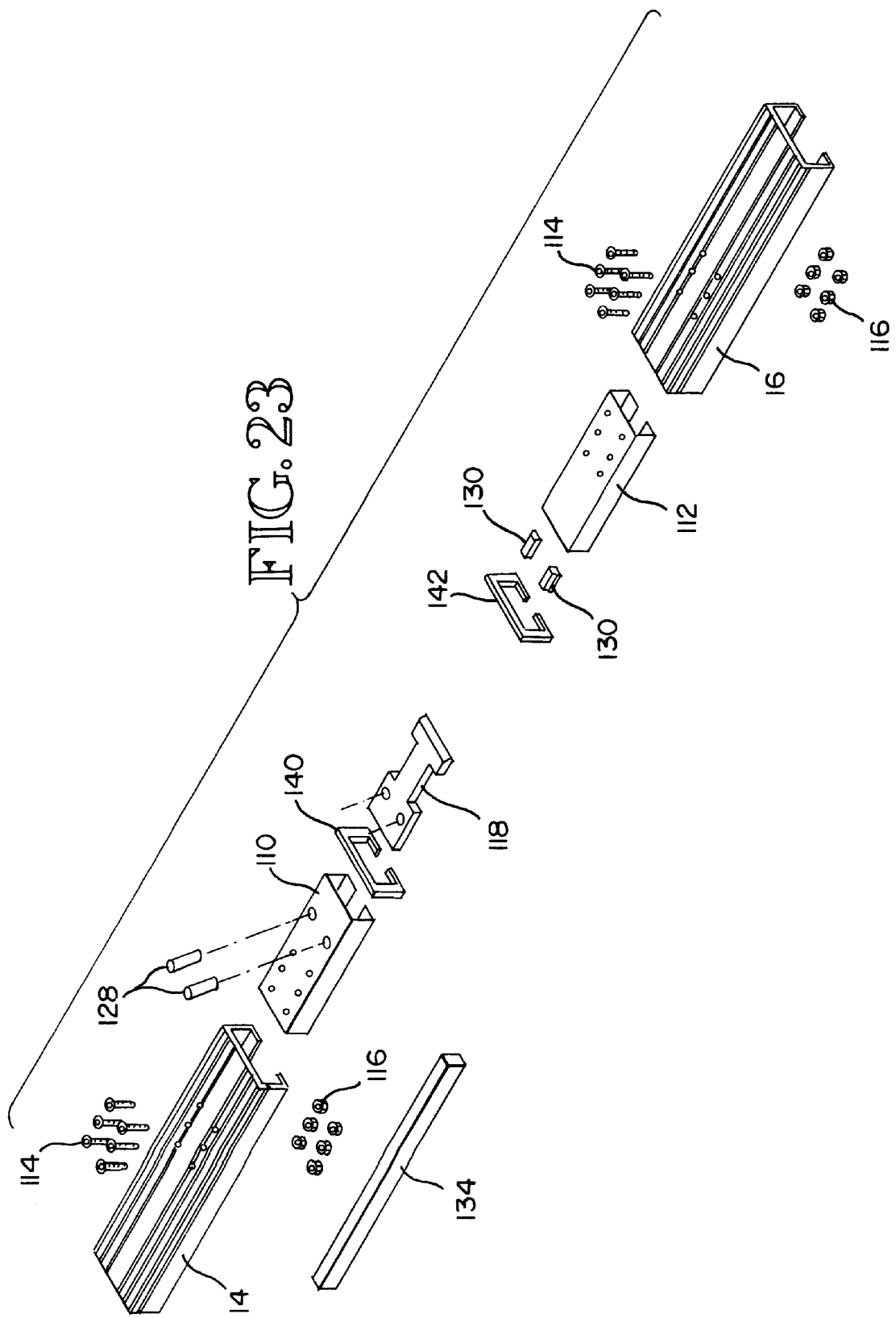

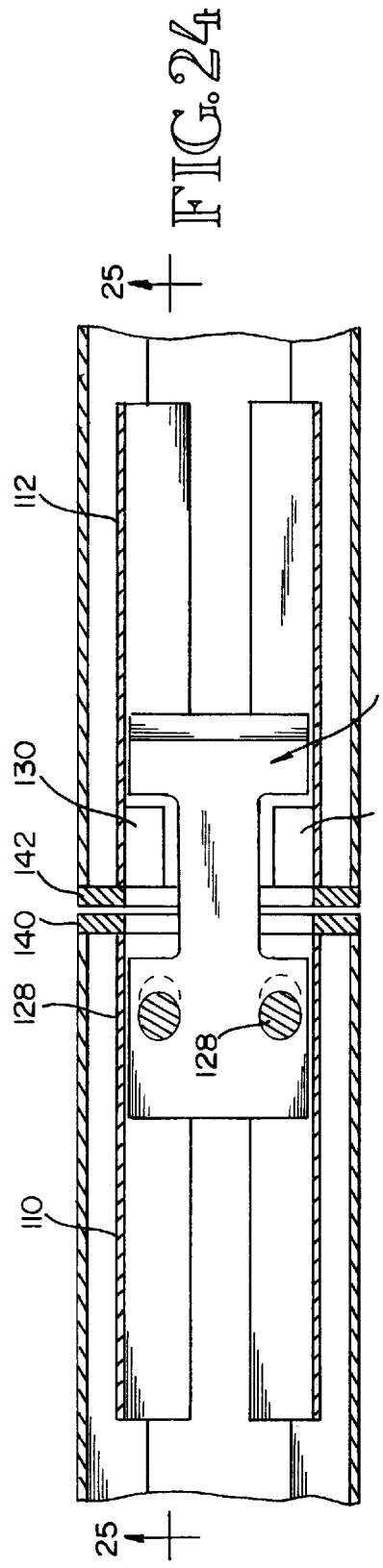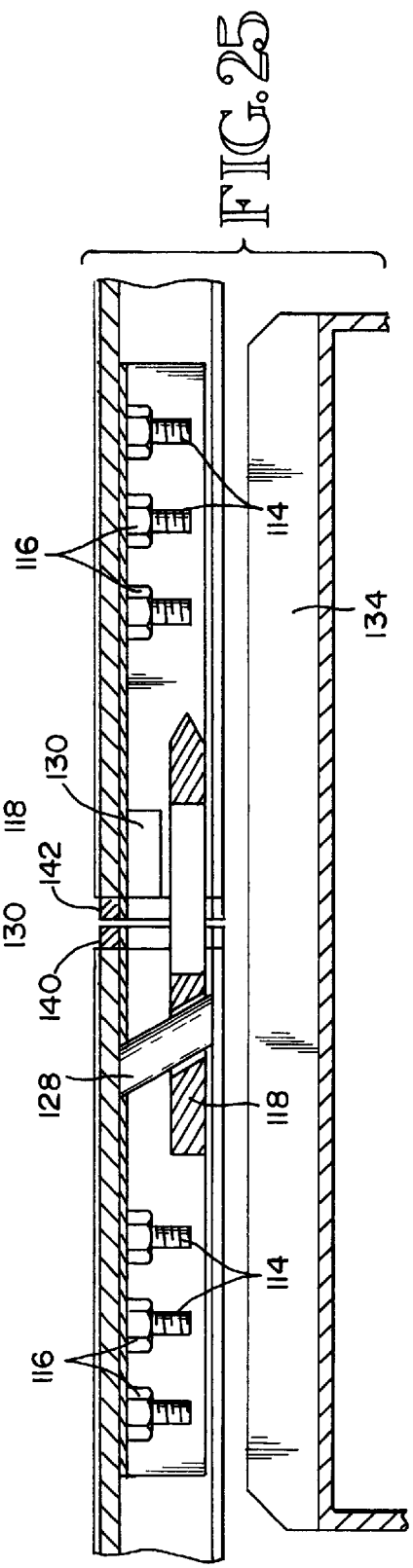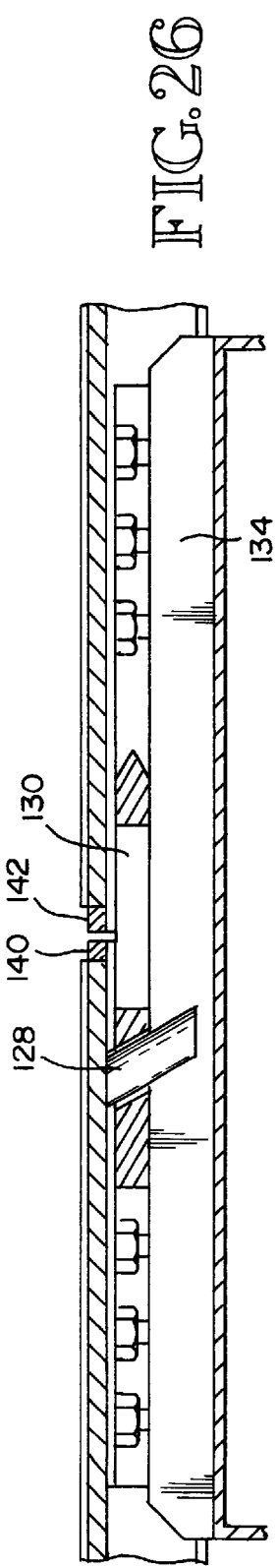

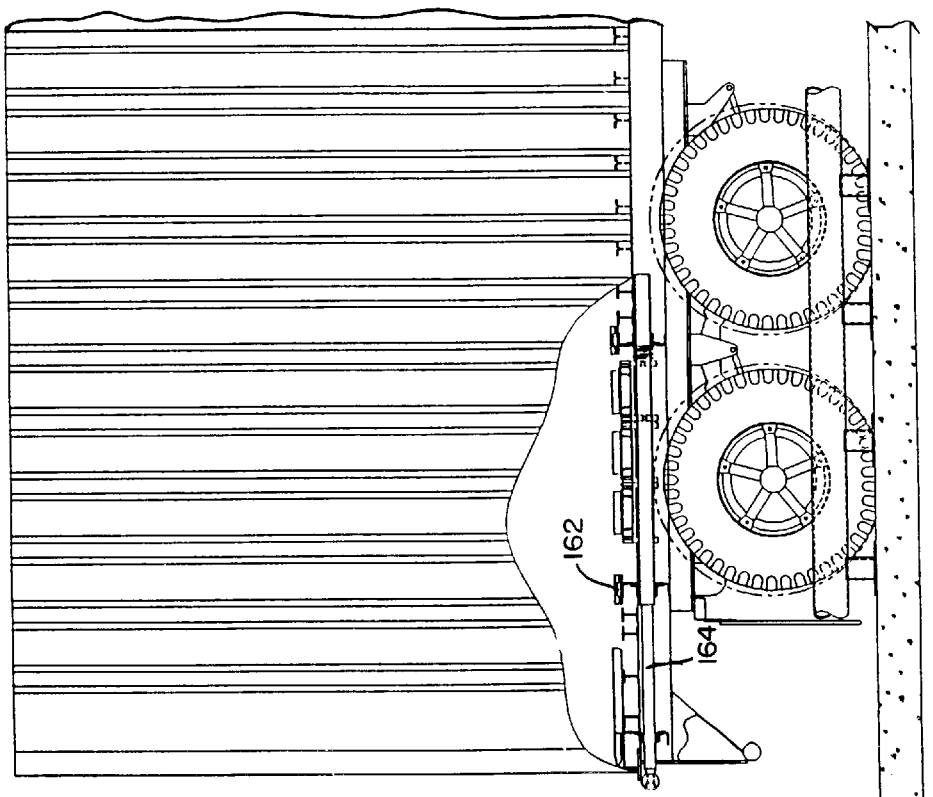
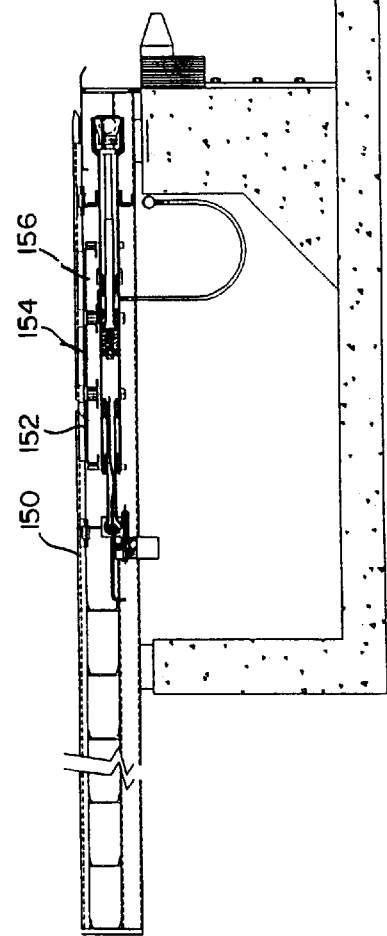
FIG. 34

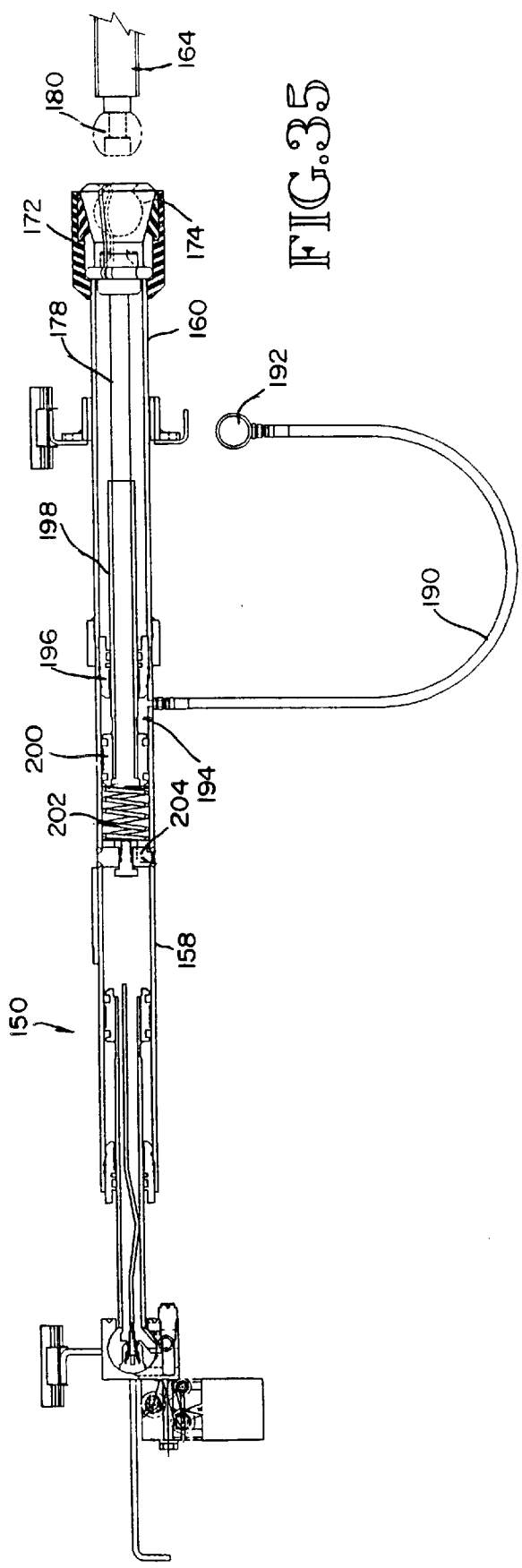
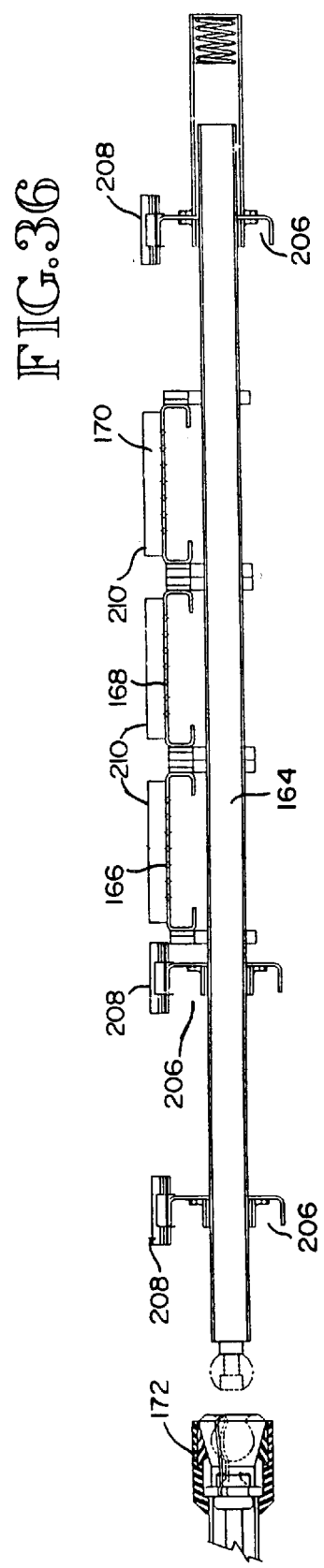

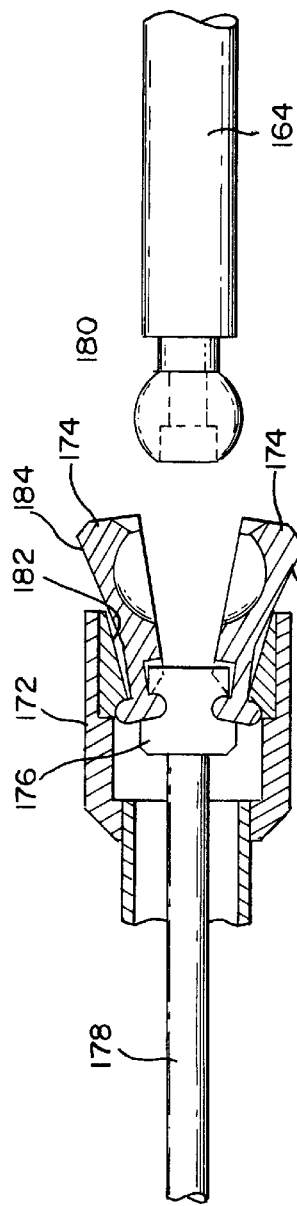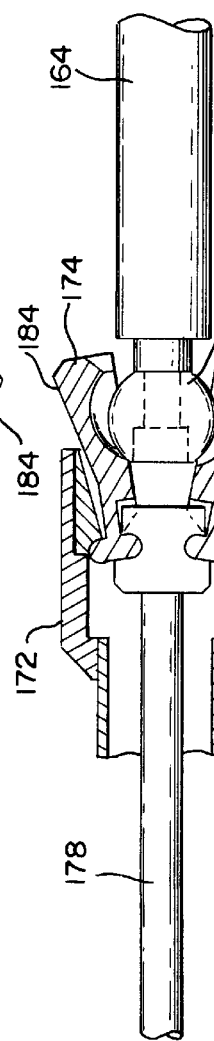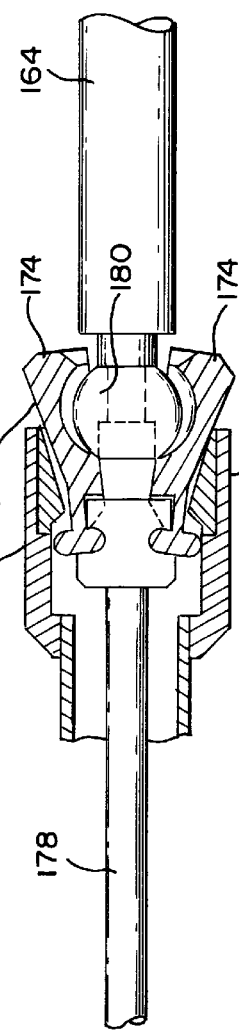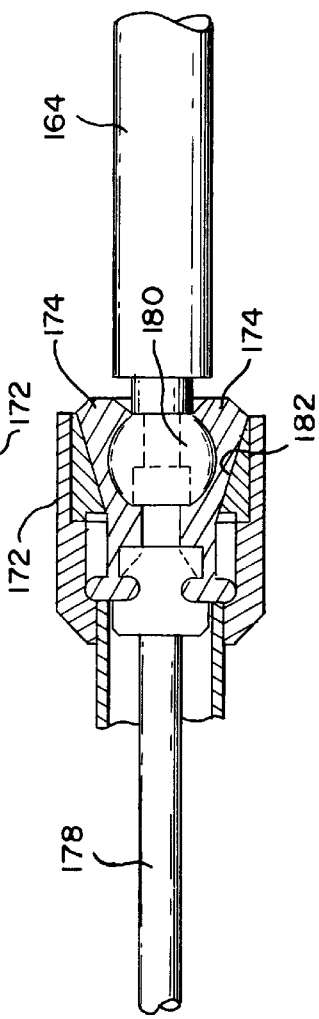

VEHICLE/DOCK LOADING/UNLOADING CONVEYOR SYSTEM

TECHNICAL FIELD

This invention relates to the use of reciprocating slat conveyors for conveying cargo from a dock to a trailer or other vehicle or from the vehicle to the dock. More particularly, the invention relates to the coordinated use of a first reciprocating slat conveyor on the dock with a second reciprocating slat conveyor in the vehicle, for moving cargo from the dock to the vehicle or from the vehicle to the dock.

BACKGROUND OF THE INVENTION

It is known to equip trailers with reciprocating slat conveyors and using the conveyors together for loading and unloading the trailer. There is a need for a system which includes a reciprocating slat conveyor on the dock that can be used in conjunction with the reciprocating slat conveyor in a trailer for both loading and unloading the trailer. A primary object of the present invention is to provide such a system.

There are basically two kinds of reciprocating slat conveyors on the market today. The first and most popular reciprocating slat conveyor is characterized by a plurality of elongated conveyor slats which are divided into sets and groups. By way of typical and therefore non-limitive example, a conveyor of this type may include eight groups and three sets, with each group comprising one slat from each set. That is, each group includes a set "1" slat, followed by a set "2" slat followed by a set "3" slat. The groups extend side-by-side across the conveyor. The conveyor slats are supported on a conveyor frame, each for longitudinal back and forth movement. A drive mechanism is provided for the conveyor slats. The drive mechanism operates to move all of the conveyor slats in unison, in a first direction, for conveying a load that is on the conveyor. Then, the conveyor slats are retracted, one set at a time, back to a start position. As each set is retracted, the remaining sets are stationary and function to hold the load in position. Following retraction of all sets, the conveyor slats are again moved in unison in the first direction for conveying the load on the conveyor an additional step. Examples of this type of conveyor are disclosed by U.S. Pat. No. 4,821,868, granted Apr. 18, 1989, to Raymond Keith Foster, and entitled Drive/Frame Assembly For A Reciprocating Floor; by U.S. Pat. No. 5,165,524, granted Nov. 24, 1992, to Raymond Keith Foster, and entitled Reciprocating Floor Conveyor; and by U.S. Pat. No. 5,605,221, granted Feb. 25, 1997, to Raymond Keith Foster and entitled Drive Unit With Bearing Mount. As is disclosed by these patents, sometimes a transverse drive beam is provided for each set of conveyor slats. Each transverse drive beam is connected to its set of conveyor slats and to a linear hydraulic drive unit for reciprocating the drive beam and the conveyor slats back and forth longitudinally of the conveyor. U.S. Pat. No. 5,165,524 discloses connecting the linear hydraulic drive units to one conveyor slat from each set at a location spaced from the transverse drive beams. The force generated by each drive unit is transmitted to the conveyor slat to which the drive unit is connected and from that conveyor slat to the transverse drive beam to which the conveyor slat is connected and onto the remaining slats of the set. U.S. Pat. No. 5,605,221 discloses providing a separate linear hydraulic drive unit for each conveyor slat.

The second type of reciprocating slat conveyor provides a continuous movement of the load on the conveyor. A majority of the conveyor slats are always moving in the conveying direction while a minority of the conveyor slats are retracting. An example of this type of conveyor is disclosed by U.S. application Ser. No. 08/827,620, filed Apr. 9, 1997, by Raymond Keith Foster, et al., and entitled Continuously Advancing Reciprocating Slat Conveyor.

U.S. Pat. Nos. 4,821,868; 5,165,524 and 5,605,221, and application Ser. No. 08/827,620 are hereby incorporated herein by this reference to them. Copending application Ser. No. 09/076,138, filed concurrently herewith, on May 12, 1998, and entitled Vehicle/Dock Alignment System, is also hereby incorporated herein by this specific reference.

DISCLOSURE OF THE INVENTION

The present invention provides a system of moving cargo that includes a dock; a powered, first reciprocating slat conveyor on the dock; a vehicle and a passive, second reciprocating slat conveyor on the vehicle. The first conveyor includes a plurality of side-by-side conveyor slats, each mounted for independent longitudinal movement. The second conveyor is positionable endwise of the powered, first reciprocating slat conveyor, . It also includes a plurality of side-by-side conveyor slats, each mounted for independent longitudinal movement. A drive mechanism is connected to the powered, first reciprocating slat conveyor, for moving its conveyor slats in one longitudinal direction, for conveying a load, and for returning the slats in the opposite longitudinal direction. The system includes detachable coupler means for coupling the powered, first reciprocating slat conveyor to the passive, second reciprocating slat conveyor, so that when the drive mechanism is operated, it will move the conveyor slats for both conveyors together in said one longitudinal direction, for conveying a load, and will return the conveyor slats of both conveyors together in the opposite longitudinal direction.

According to one aspect of the invention, the detachable coupler means directly connects end portions of at least some of the conveyor slats of the powered, first reciprocating slat conveyor to end portions of at least some of the conveyor slats of the passive, second reciprocating slat conveyor.

According to another aspect of the invention, the powered, first reciprocating slat conveyor and the passive, second reciprocating slat conveyor each has at least three sets of conveyor slats and at least one group of one conveyor slat from each set. Each conveyor comprises a transverse drive beam for each set of conveyor slats. Each transverse drive beam is connected to its set of conveyor slats. The detachable coupler means detachably connects the transverse drive beams of the passive, second reciprocating slat conveyor to the transverse drive beams of the powered, first reciprocating slat conveyor.

In one example of the invention, the detachable coupler means connects one conveyor slat from each set of conveyor slats in the passive, second reciprocating slat conveyor to a corresponding conveyor slat in the powered, first reciprocating slat conveyor.

In another example of the invention, the detachable coupler means connects the transverse drive beams of the powered, first reciprocating slat conveyor, each to a conveyor slat of the passive, second reciprocating slat conveyor that is connected to a corresponding transverse drive beam of the passive, second reciprocating slat conveyor.

According to another aspect of the invention, the detachable coupler comprises a first coupler element on a conveyor slat of the powered, first reciprocating slat conveyor, and a second coupler element on a corresponding conveyor slat of the passive, second reciprocating slat conveyor that is engageable with the first coupler element for coupling the two conveyor slats together.

In one embodiment, the detachable coupler means comprises an end member on a conveyor slat of one of the reciprocating slat conveyors, and a piston carried by a corresponding conveyor slat of the other reciprocating slat conveyor. The end member includes a longitudinal tunnel opening and an inner radial surface bordering the opening. The piston has a rod position that is movable longitudinally into and through the tunnel opening in the end member. Following its extension into and through the tunnel opening, the piston is rotatable into a second position. The piston includes a hook portion at its outer end having a radial lock surface. The hook portion is movable by rotation of the piston from its first position into its second position. When the piston is in its second position the hook portion is in a locked position in which its radial lock surface confronts the inner surface of the end member and prevents retraction of the piston while it remains in its second position, thereby coupling the two conveyor slats together.

According to another aspect of the invention, the drive mechanism includes a separate hydraulic piston-cylinder drive unit for each drive beam of the powered, first reciprocating slat conveyor. Each said piston-cylinder drive unit includes a fixed portion that is anchored to a frame and a movable portion that is connected to a transverse drive beam and moves back and forth longitudinally relative to the fixed portion of the drive unit. The coupler element is connected to the movable portion of the piston-cylinder drive unit. The passive, second reciprocating slat conveyor includes a plurality of longitudinally extending drive rods, one for each transverse drive beam of the passive, second reciprocating slat conveyor. Each drive rod is connected to its transverse drive beam. Each drive rod includes a coupler element that is connectable to the coupler element on the movable portion of a corresponding piston-cylinder drive unit. Accordingly, when the coupler element on the movable portion of each piston-cylinder drive unit is connected to the coupler element on the corresponding drive rod, each transverse drive beam of the passive, second reciprocating slat conveyor is connected to a corresponding piston-cylinder drive unit of the powered, first reciprocating slat conveyor.

In one embodiment, the coupler elements on the ends of the drive rods are in the nature of a ball and the coupler elements that are connected to the movable portion of the piston-cylinder drive units are ball clamps that are selectively operable to clamp onto or release the balls. Preferably, each ball clamp is on an outer end of a longitudinally movable control rod. The system includes means for extending and retracting the control rod. Extension of the control rod causes the ball clamp to open and release its ball. Retraction of the control rod causes the ball clamp to close and engage its ball.

Another aspect of the invention is to provide a system of tandem, reciprocating slat conveyors, comprising a powered, first reciprocating slat conveyor and a passive, second reciprocating slat conveyor. The first reciprocating slat conveyor includes a plurality of side-by-side conveyor slats, each mounted for independent longitudinal movement. The passive, second reciprocating slat conveyor also includes a plurality of side-by-side conveyor slats, each mounted for independent longitudinal movement. A drive mechanism is connected to the powered, first reciprocating slat conveyor for moving its conveyor slats in one longitudinal direction for conveying a load, and returning the slats in the opposite longitudinal direction. A detachable coupler means is provided for coupling the powered, first reciprocating slat conveyor to the passive, second reciprocating slat conveyor, so that when the drive mechanism is operated it will move the conveyor slats for both conveyors together in said one longitudinal direction, for conveying a load, and will return the conveyor slats of both conveyors together in the opposite longitudinal direction. The coupler means includes a first end member at the end of each conveyor slat of the powered conveyor and a second end member at a confronting of a related conveyor slat of the passive conveyor. One of the end members includes a socket and the other of the end members includes a projection that snugly fits within the socket. The detachable coupler means further includes a hook member that extends longitudinally from one of the conveyor slats through both of the end members and hooks onto an inner radial surface portion of the end member of the second conveyor slat, and pulls the two conveyor slats together and pulls the projection into the socket. In preferred form, the hook member is extendable axially through a tunnel opening in the second end member and is then rotatable into a position where it engages the radial inner surface of the second end member. In preferred form, the rotatable piston and hook member are also movable axially. Fluid means may be provided for moving the hook member axially against the radial inner surface of the second end member.

According to another aspect of the invention, a system of tandem, reciprocating slat conveyors is provided in which the detachable coupler means for coupling a powered, first reciprocating slat conveyor to the passive, second reciprocating slat conveyor comprises a hook member carried by at least some of the conveyor slats of one of the conveyors and abutment means carried by confronting conveyor slats of the other conveyor. The hook member projects or extends from its conveyor slat and is insertable into the end of its confronting conveyor slat of the other conveyor, below the abutment means. A lifting means is providing for lifting the hook member into a position of engagement with the abutment means.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is a pictorial view of a trailer backed up to a dock, for either receiving or depositing a load, such view being taken from above and looking towards the top, the driver's side and the rear end of the trailer, with the interior of the trailer shown for the purpose of depicting cargo that is on a reciprocating slat conveyor that forms the floor of the trailer, such view also showing a complementary slat conveyor on the dock;

FIG. 2 is an exploded pictorial view of a mechanism for coupling together the confronting ends of the conveyor slats within the trailer and on the dock, such view showing an end portion of two conveyor slats that are to be connected and further showing most of the mechanism that does the connecting;

FIG. 3 is an enlarged scale, fragmentary, longitudinal sectional view of a linear hydraulic motor that is carried by at least one conveyor slat from each slat set of the dock conveyor;

FIG. 4 is an enlarged scale, fragmentary, longitudinal sectional view where the rod end of the linear hydraulic motor shown by FIG. 3 joins the cylinder end of a rotary linear hydraulic drive unit that functions to rotate a piston rod that has a hook at its outer end;

FIG. 10 is an exploded pictorial view of two end pieces that are connected to the confronting ends of the dock and vehicle conveyor slats;

FIG. 11 is a view like FIG. 10 but with the end pieces connected to end portions of the conveyor slats;

FIG. 12 is a view like FIG. 10 but taken from the opposite end of the fittings;

FIG. 13 is a view like FIG. 11 but showing the end pieces plugged together;

FIG. 14 is a view like FIG. 11 but taken towards the opposite end fitting;

FIG. 15 is a view like FIG. 13 but taken from the aspect of FIG. 14;

FIG. 17 is a fragmentary side elevational view of the piston end of the rotary lock rod, such view showing a cam at the piston end that is in a first position;

FIG. 18 is a view like FIG. 17, but showing the rod and cam rotated ninety degrees;

FIG. 19 is a longitudinal sectional view taken substantially along line 19—19 of FIG. 4, such view showing the piston of the rotary linear hydraulic motor extended;

FIG. 20 is a view like FIG. 19 but showing the piston retracted;

FIG. 23 is an exploded pictorial view of the confronting end portions of a dock conveyor slat and a corresponding trailer conveyor slat and showing the lock elements that each includes, such view also showing a lock engaging bar that is a part of the lock engaging beam that is below the rear end portion of the dock conveyor;

FIG. 24 is an enlarged scale, fragmentary view of the lock elements that are inside the confronting end portions of a dock conveyor slat and a corresponding trailer conveyor slat;

FIG. 25 is a longitudinal sectional view taken substantially along line 25—25 of FIG. 24, and showing the lock actuating beam in a lowered position;

FIG. 26 is a view like FIG. 25, but showing the lock actuating beam in a raised position and showing the lock elements engaged;

FIG. 34 is a side elevational view of a trailer backed up towards a dock, but with the rear end of the trailer spaced from the dock end, such view including a foreground portion of the dock cut away to expose elements of a reciprocating slat conveyor that is incorporated within the dock, and including a foreground portion of the trailer cut away to expose elements of a reciprocating slat conveyor that are within the trailer;

FIG. 35 is an enlarged scale view of the dock conveyor portion of FIG. 34, presenting a longitudinal sectional view of a linear hydraulic drive unit that is a part of the dock conveyor;

FIG. 36 is an enlarged scale view of the trailer conveyor portion of FIG. 34, presenting a longitudinal sectional view of a drive rod that is a part of the passive slat conveyor that is within the trailer;

FIG. 37 is an enlarged scale longitudinal sectional view of an expandable/retractable socket that is at the trailer end of the dock drive unit and a corresponding ball member that is at the dock end of the corresponding drive rod portion of the trailer conveyor, such view showing the ball spaced from the socket and showing the socket end in an expanded position;

FIG. 38 is a view like FIG. 37, but showing the ball member moved relatively into the expandable socket and showing the jaws of the socket still in an expanded position;

FIG. 39 is a view like FIGS. 37 and 38 but with the jaws of the socket partially retracted; and FIG. 40 is a view like FIGS. 37-39, but showing the jaws of the socket retracted around the ball member and pulling the ball member into a housing for the socket jaws.

BEST MODE FOR CARRYING OUT THE INVENTION

Figure 5:
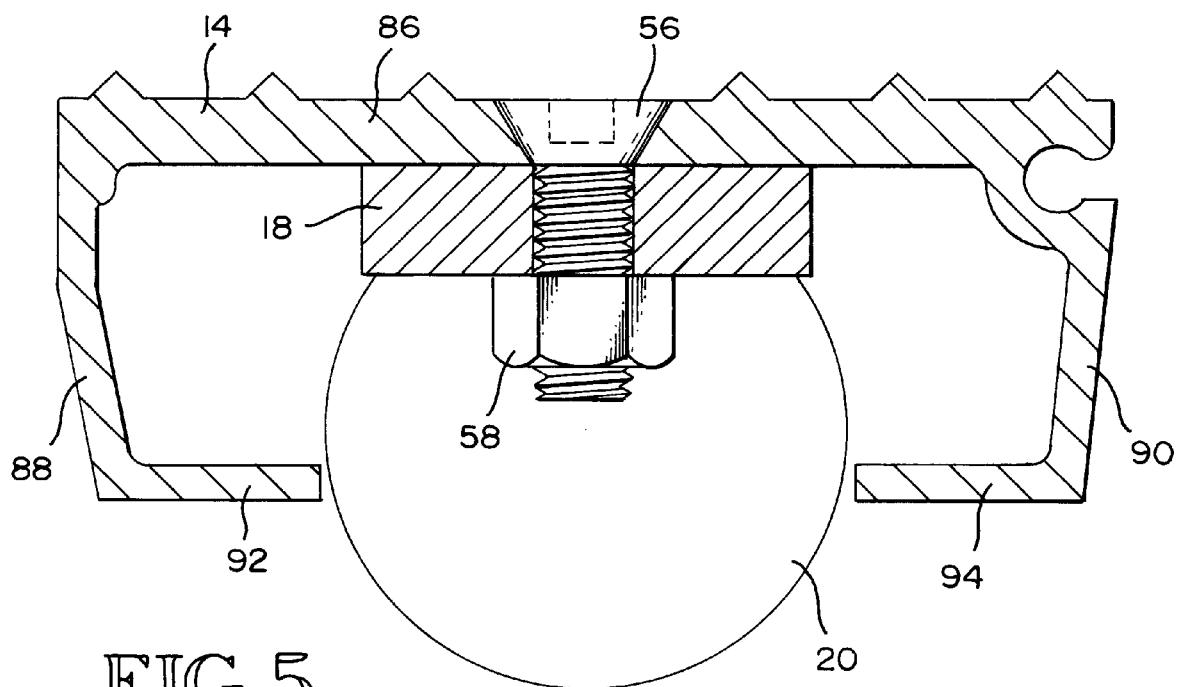
FIG. 5 is an enlarged scale, cross-sectional view taken substantially along 5—5 of FIG. 3.
Figure 6:
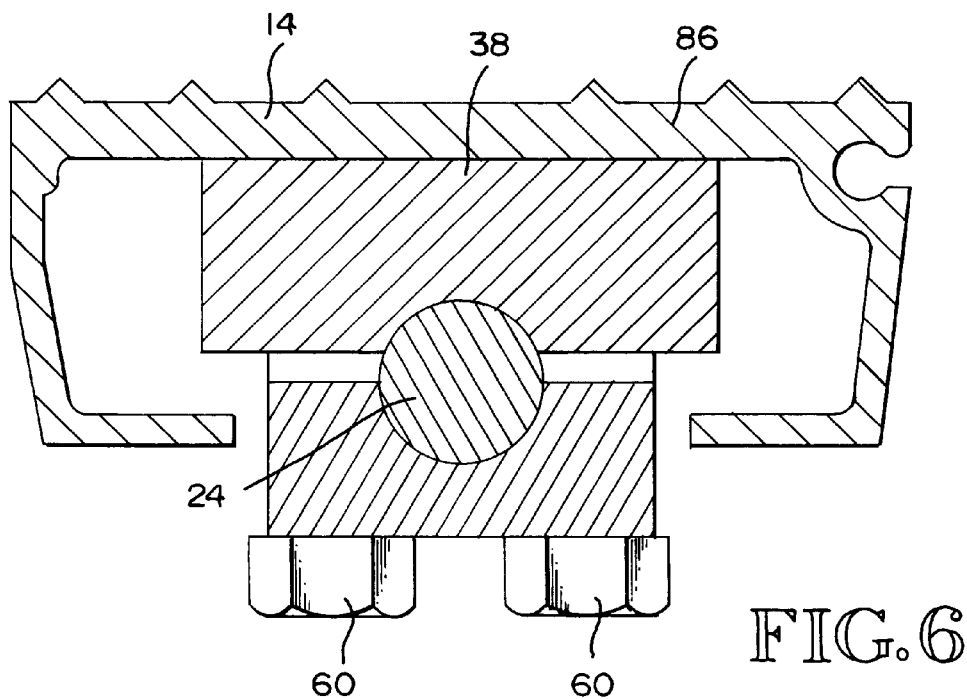
FIG. 6 is an enlarged scale, cross-sectional view taken substantially along line FIG. 6—6 of FIG. 4.

FIG. 1 shows a trailer T that includes a first reciprocating slat conveyor 10 and a dock D that includes a second reciprocating slat conveyor 12. Although a trailer T is shown, the vehicle may be a truck or some other vehicle having a cargo carrying bed or box. The conveyors 10, 12 will herein sometimes be referred to as the vehicle conveyor 10 and the dock conveyor 12. FIG. 1 shows the vehicle conveyor 10 in alignment with the dock conveyor 12. In use, the two conveyors are operated together to either move a load from the trailer conveyor 10 onto the dock conveyor 12 or from the dock conveyor 12 onto the trailer conveyor 10. In this manner, the two conveyors 10, 12 are used together for loading or unloading the trailer T or other vehicle. The conveyors 10, 12 may be basically like any of the conveyors disclosed in the aforementioned U.S. Pat. Nos. 4,821,868; 5,165,524; and 5,605,221 or in the aforementioned application Ser. No. 08/827,620. One difference, however, is that one of the conveyors 10, 12 may be a passive conveyor. This means that it does not include its own drive mechanism and also may not even include transverse drive beams. The other conveyor of the pair includes a drive mechanism that serves at the drive mechanism for both conveyors 10, 12. In preferred form, the dock conveyor 12 will include a drive mechanism. The vehicle conveyor 10 will be without its own drive mechanism. It will be a passive conveyor and will be driven by the drive mechanism for dock conveyor 12.

As earlier stated, the conveyor slats of the vehicle conveyor 10 can be directly coupled to the conveyor slats of the dock conveyor 12. Or, the vehicle conveyor 10 may be provided with transverse drive beams and a mechanism may be provided for coupling the dock conveyor 12 with these transverse drive beams. For example, the vehicle conveyor 10 may be provided with three transverse drive beams, one for each set of conveyor slats, in the manner disclosed by U.S. Pat. No. 5,165,524. Then, three of the conveyor slats for conveyor 10, one for each set of conveyor slats and, hence, one for each transverse drive beam, may be coupled at its end to a confronting end of a corresponding slat of the power driven dock conveyor 12. Or, a mechanism may be provided for coupling the transverse drive beams of the powered dock conveyor 12 with the transverse drive beams of the passive vehicle conveyor 10.

FIGS. 2–29 illustrate mechanisms for coupling dock conveyor slats 14 with vehicle conveyor slats 16. These mechanisms may be provided for each slat pair 14, 16. Or, the mechanism may be provided for only three of the slat pairs 14, 16 constructed to be longitudinal drive beams in the manner disclosed in U.S. Pat. No. 5,165,524.

Referring to FIG. 2, a mounting bar 18 extends endwise from a cylinder housing 20 of an actuator 22. A piston rod 24 projects from a piston head 26 out through an end 28 of the housing 20 opposite the mounting bar 18. Piston head 26 divides the interior of the housing 20 into first and second working chambers 30, 32 that are on opposite sides of the piston head 26. A first inlet/outlet port 34 leads to and from working chamber 30. A second inlet/outlet port 36 leads to and from working chamber 32. The introduction of fluid pressure into chamber 32 while port 34 is connected to return causes the piston 24 to retract within the housing. Introduction of fluid pressure into chamber 30 while port 36 is connected to return will cause an extension of the piston rod 24.

As best shown by FIG. 4, the end of piston rod 24 opposite the piston head 26 is connected to a first end 38 of a second cylinder housing 40. Cylinder housing 40 includes a piston head 42 that is at one end of a piston rod 44. Piston rod 44 projects endwise outwardly from the second end 46 of housing 40 to and through a guide structure 48, 50 the upper portion 50 of which is located inside of the conveyor slat 14. Rod 44 includes an end portion 52 that projects endwise outwardly from the structure 48, 50. It includes a hook 54 at its end. As shown by FIGS. 3 and 4, the assembly 28 fits up inside of the conveyor slat 14. Nut and bolt assemblies 56, 58 connect the member 18 to the conveyor slat 14. Bolts 60 (FIG. 6) connect member 38 to the end of housing 40.

Figure 7:
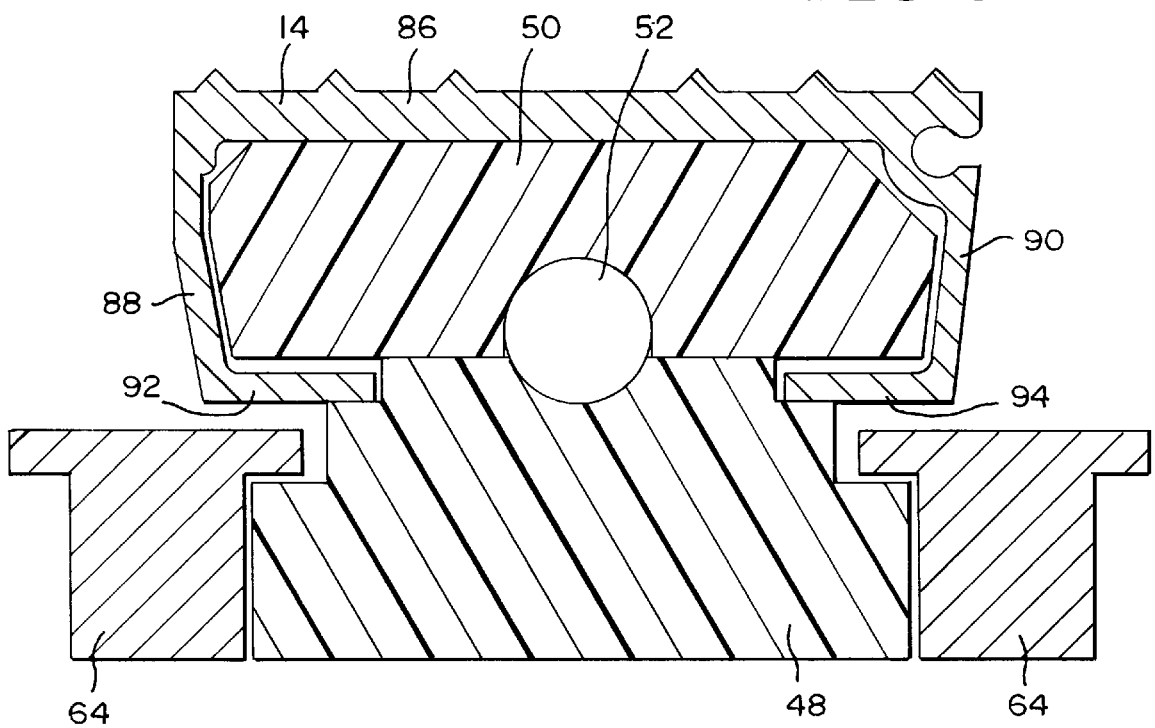
FIG. 7 is an enlarged scale cross-sectional view taken substantially along line 7—7 of FIG. 2, and including a portion of the dock conveyor slat and some mounting frame members that are a part of the dock conveyor.

The conveyor slats 14, 16 are supported in both conveyors by the support beam/bearing construction that is, by way of example, is disclosed in U.S. Pat. No. 4,858,748, granted Aug. 22, 1989 to Raymond Keith Foster and entitled Bearing System For Reciprocating Floor Conveyor and in U.S. Pat. No. 5,303,816, granted Apr. 19, 1994 to Raymond Keith Foster and entitled Seal Strip For Reciprocating Floor Conveyors. Referring to FIG. 7, the members 48 are connected to conveyor frame members 64 which are stationary. Member 50 may be stationary or movable. Members 48, 50 may be constructed from a self-lubricating plastic bearing material. At times, there is relative movement between rod 44 and members 48, 50.

Figure 8:
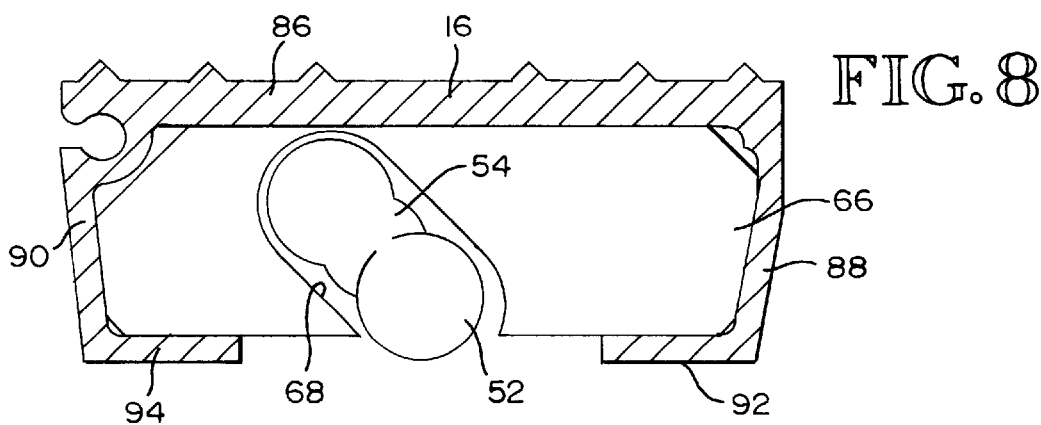
FIG. 8 is an enlarged scale cross-sectional view taken substantially along line 8—8 of FIG. 2, such view showing a hook at the outer end of the rod aligned with a tunnel opening in a lock block that is within a corresponding trailer conveyor slat.
Figure 9:
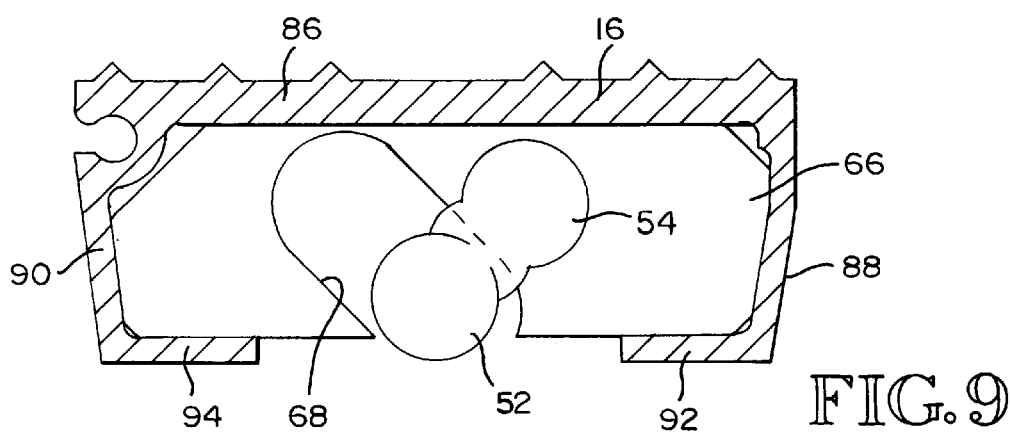
FIG. 9 is a view like FIG. 8 but showing the hook rotated over into a lock block engaging position.
Figure 16:
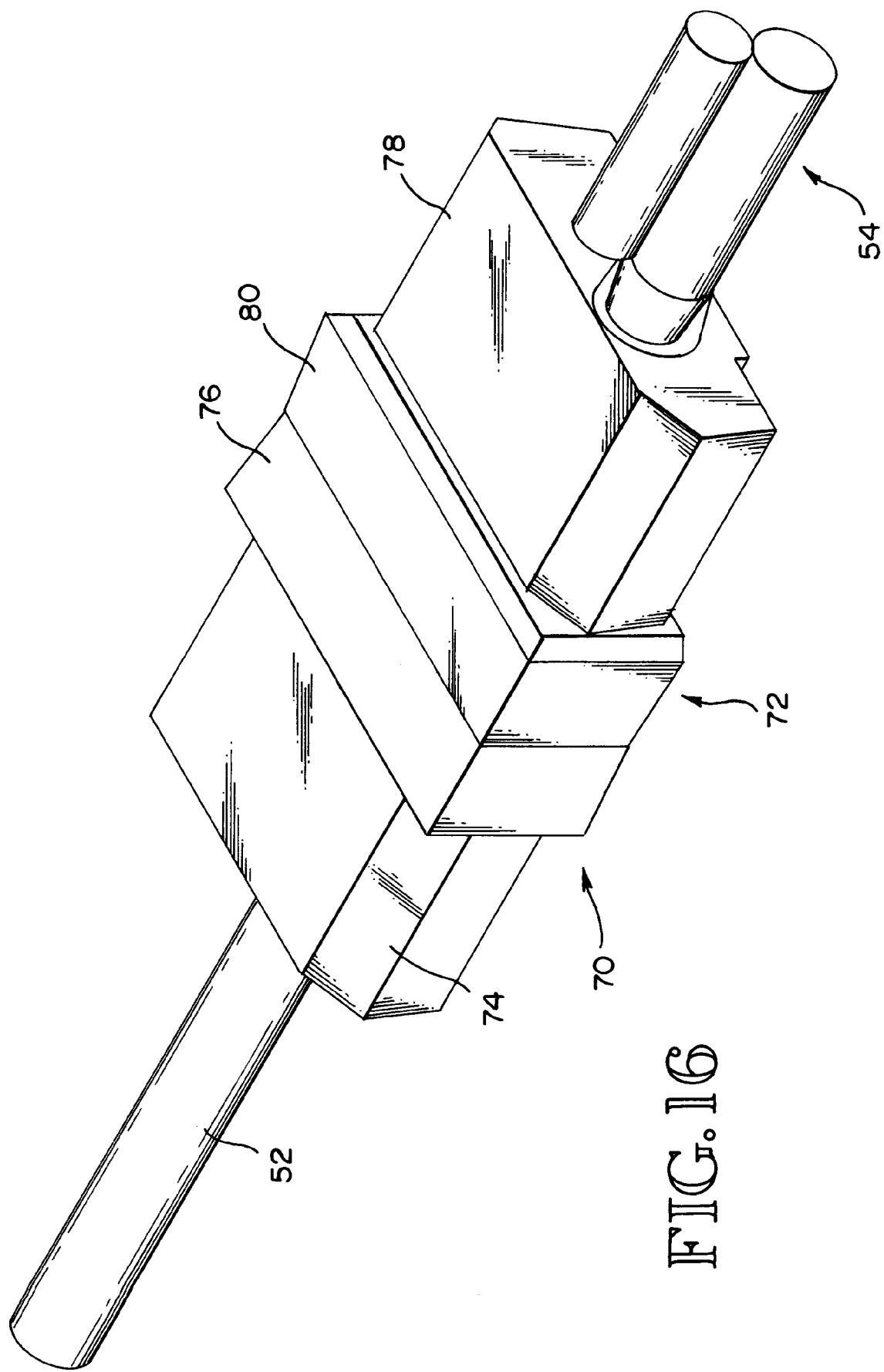
FIG. 16 is a view taken from the aspect of FIG. 10, but showing the two end fittings together and further showing the lock rod in place and rotated to place its hook into a lock position.
Figure 21:
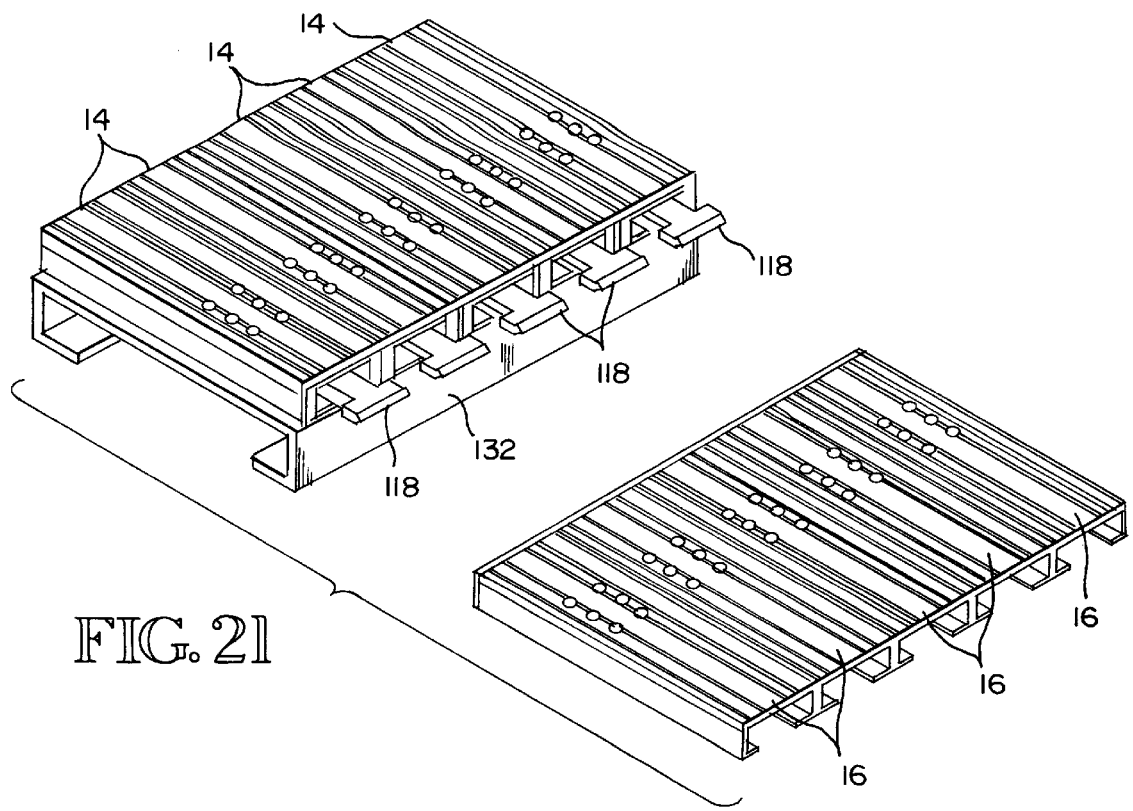
FIG. 21 is a fragmentary pictorial view of a rear portion of a modified dock conveyor and a confronting portion of a modified trailer conveyor, such view showing a lock actuating beam in a raised position.
Figure 22:
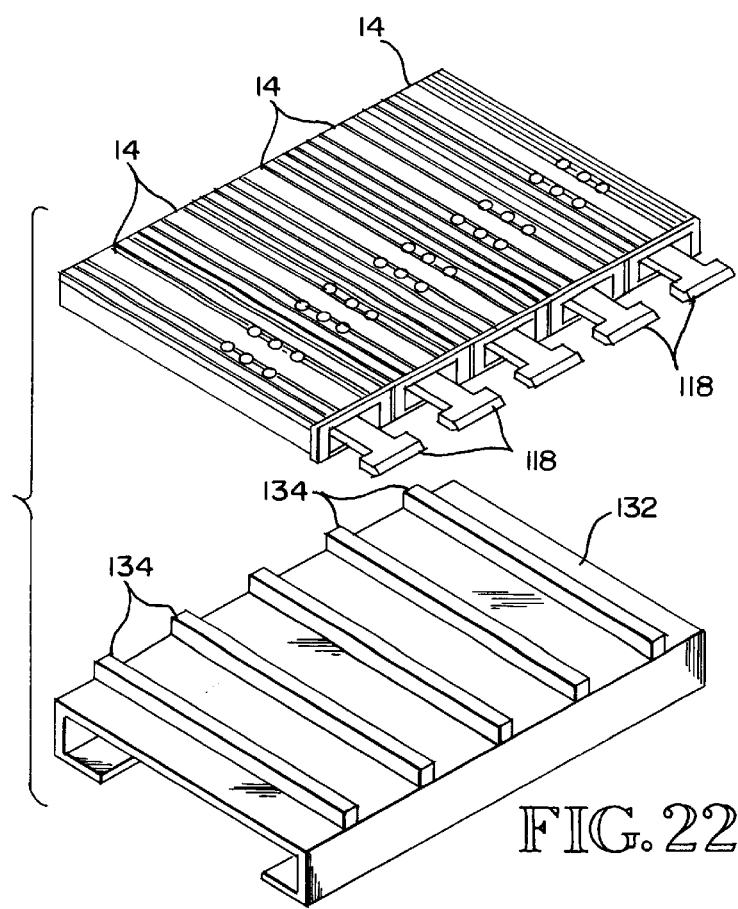
FIG. 22 is a pictorial view of the dock conveyor portion of FIG. 21, showing the lock actuating beam spaced below the rear end portion of the dock conveyor.

In this embodiment, the conveyor slats 16 include internal members 66 that are secured to the conveyor slats 16. Members 66 include tunnel openings 68 that are sized and shaped to receive the hook portion 54 at the rod end portion 52 of rod 44. FIG. 8 shows the hook portion 54 inside the tunnel opening 68. FIG. 9 shows the hook portion 54 inwardly of member 64 and rotated into a position out of alignment with opening 68 and in alignment with a portion of the member 64. Referring to FIGS. 10–16, in preferred form, the conveyor slats 14, 16 are provided with end members 70, 72. End members 70 include inner end portions 74 which extend into the conveyor slats 14. Members 70 include outer end portions 76 which are positioned endwise outwardly of the conveyor slats 14 when the members 70 are connected to the conveyor slats 14. End members 72 have inner end portions 78 that fit into the conveyor slat 16. They include outer end portions 80 that are positioned endwise outwardly of the conveyor slats 16 when the end members 72 are connected to the conveyor slats 16. End members 70, 72 and conveyor slats 14, 16 may all be constructed from an aluminum alloy. The end members 70, 72 may be connected to the conveyor slats 14, 16 by welding. A weld bead may be applied for the ends of conveyor slats 14, 16 contact the end portions 76, 80 of the end pieces 70, 72. In the preferred embodiment, the end members 72 serve the purpose of the members 66. They include the tunnel openings 68. The end members 70 may be positioned endwise outwardly of the members 50.

According to an aspect of the invention, one of the end pieces 70, 72 may include a recess at its outer end and the other may include a complementary projection. In the illustrated embodiment, end members 72 include a recess 82 and the end pieces 76 include a complementary projection 84. As illustrated, the recesses 82 and projections 84 may be oval in shape and may be tapered. When the conveyor slats 14, 16 are moved together (FIGS. 13 and 15) the projections 84 enter into the recesses 82. The tapering surfaces contact each other and this moves the conveyor slats 14, 16 into substantially precise alignment with each other.

Referring to FIGS. 5–9, the conveyor slats 14, 16 are each shown to have a flanged channel shape. They each include a top 86, a pair of opposite sidewalls 88, 90 and a pair of bottom flanges 92, 94. The sidewalls 88, 90 depend generally downwardly from the tops 86. The flanges 92, 94 project inwardly towards each other, in coplanar parallelism. The flanges 92, 94 are in spaced parallelism with the tops 86.

Referring to FIGS. 2,4 and 17–20, the piston head 42 includes a seal groove 94 in which an O-ring seal 96 is received (FIGS. 4, 19 and 20). Piston head 42 includes an end portion 98, extending from it in a direction opposite the rod 44. This end portion 98 includes a cam surface 100 that is helical and substantially like a screw thread. It contacts a stationary pin 102. A first inlet/outlet port 104 communicates with a first working chamber 108. A second inlet/outlet port 106 communicates with a second working chamber 110. Introduction of fluid pressure into working chamber 108, while working chamber 110 is connected to return, causes an extension of the piston rod 44. It also causes a rotation of the piston rod 44 and the hook 54 because of contact between cam surface 100 and pin 102. The cam surface 100 is configured to cause about ninety degrees of rotation of the piston rod 44 in response to a full extension of the piston rod 44. When fluid pressure is introduced into working chamber 110 and working chamber 108 is connected to return, the piston rod 44 is retracted and rotated approximately ninety degrees back to its original position.

In operation, there is a hook assembly 22 connected to at least 3 of the conveyor slats 14. In preferred form, each conveyor slat 14 is provided with a hook assembly 22. End portions 52 of the rods 44, including the hooks 54, project outwardly from the conveyor slats 14. When the end members 70 are used, they project outwardly from the end members 70. Following placement of the conveyor slats 16 and substantial alignment with the conveyor slats 14, fluid is introduced into the working chambers 30 and working chambers 32 are connected to return so that the rods 24 and the cylinder housings 40 connected to them are extended. This extension causes axial movement of the end portions 52 and hooks 54 through the tunnel openings 68. The hook portions 54 are moved completely through the end members 62. Then, fluid pressure is introduced into one of the working chambers 108, 110 and the other is connected in return, to cause both an axial movement and rotation of the rods 44, their end portions 52 and the hooks 54, to move the hooks from the position shown in FIG. 8 into the position shown in FIG. 9. This places the inserts 72 into the path of the hook members 54. Then fluid pressure is introduced into working chambers 32 and working chambers 30 are connected to return, so that the rods 24 are retracted. This pulls the housings 40 and the rods 44 into the conveyor slats 14 and moves the hooks 54 into tight contact with the end members 72. This also moves the projections 84 tightly into the recesses 82, causing the tapered side surfaces of the projections 84 and the recesses 82 to cam the conveyor slats 14, 16 into a substantially precise alignment. The engagement of the projections 84 in the recesses 82 also holds against rotation of conveyor slats 14, 16, each relative to the other.

Figure 27:
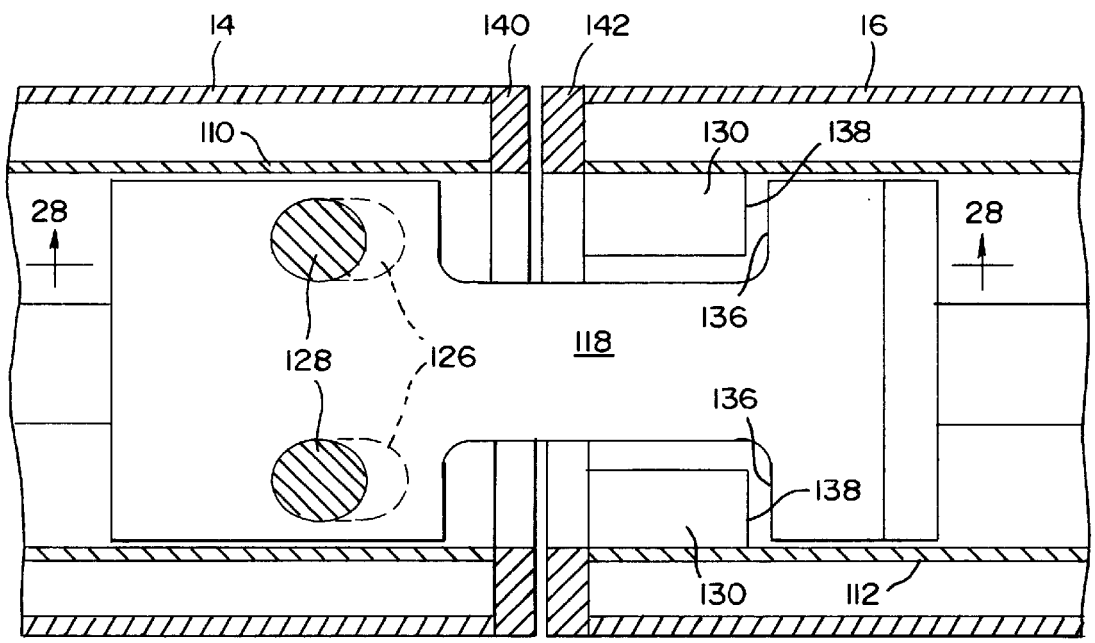
FIG. 27 is an enlarged scale view of the central portion of FIG. 24.
Figure 28:
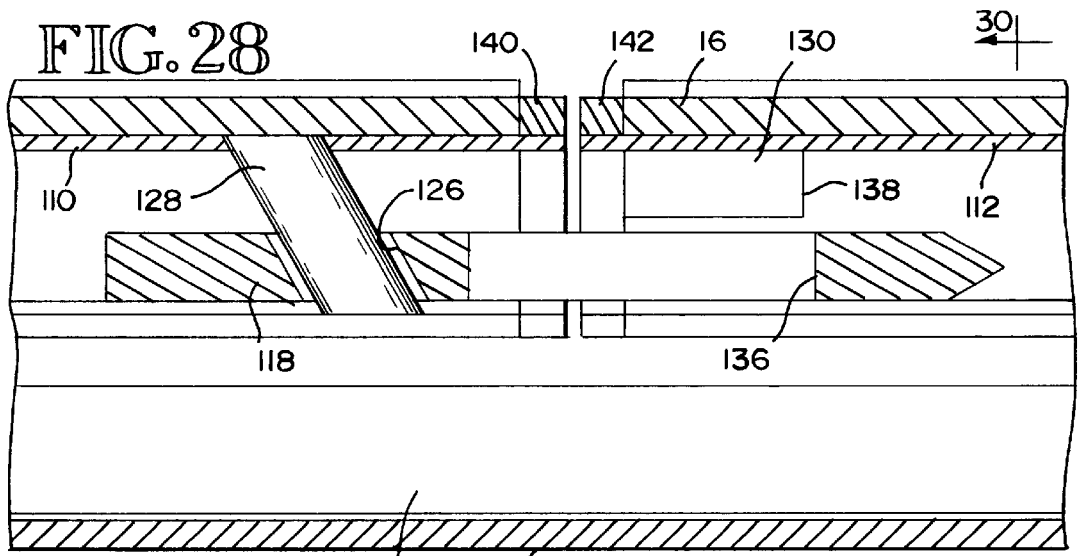
FIG. 28 is an enlarged scale view of the central portion of FIG. 25, constituting a longitudinal sectional view taken substantially along line 28—28 of FIG. 27.
Figure 29:
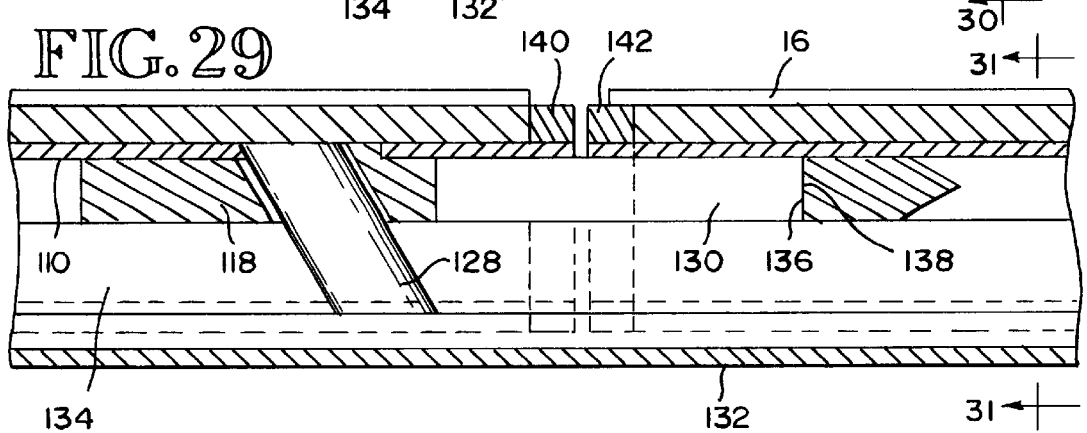
FIG. 29 is an enlarged scale view of the central portion of FIG. 26.
Figure 30:
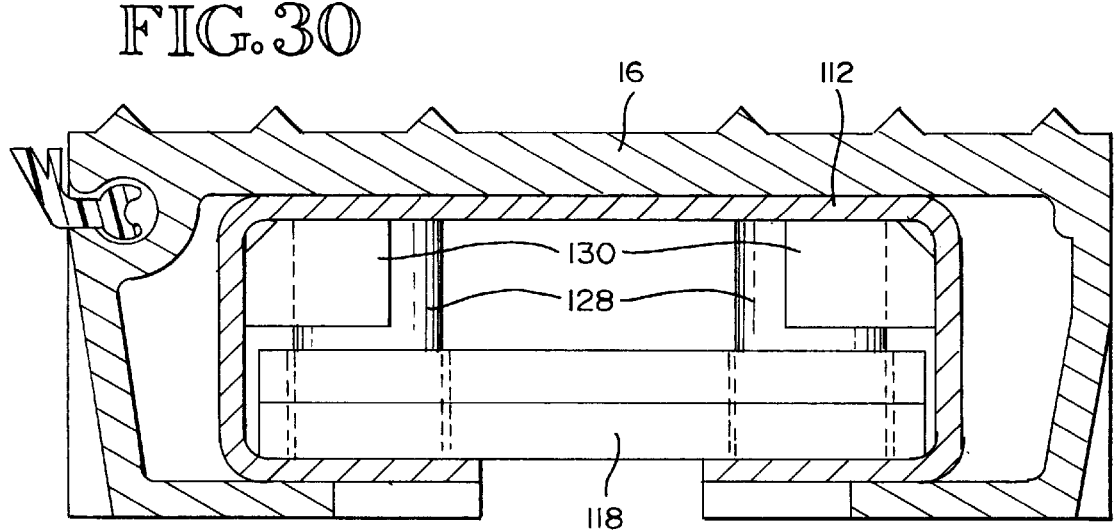
FIG. 30 is a cross-sectional view taken substantially along line 30—30 of FIG. 28.
Figure 31:
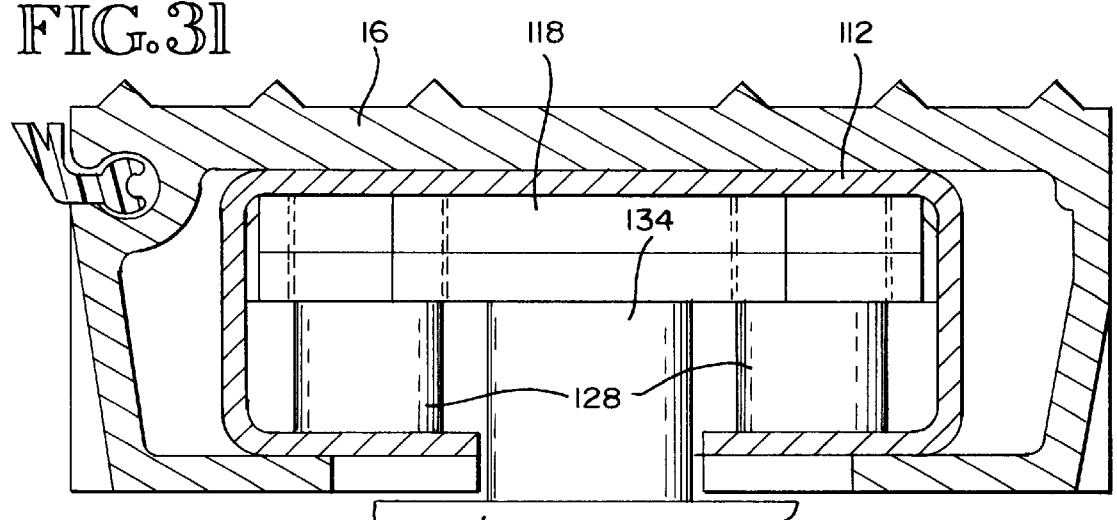
FIG. 31 is a cross-sectional view taken substantially along line 31—31 of FIG. 29.
Figure 32:
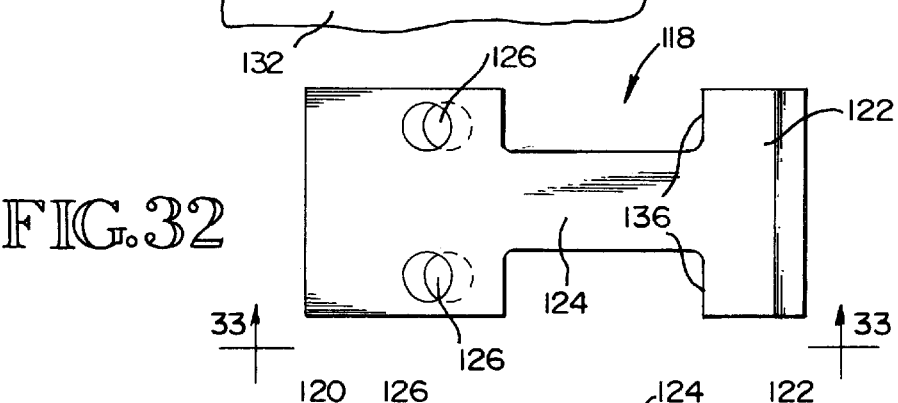
FIG. 32 is a top plan view of the lock hook of FIGS. 21-31.
Figure 33:
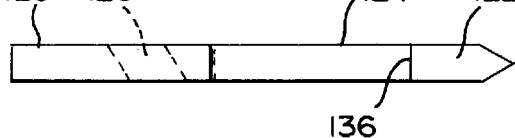
FIG. 33 is a side elevational view of the lock hook, taken substantially along line 33—33 of FIG. 32.

FIGS. 21–33 disclose a modified system for connecting the dock slats 14 to the vehicle slats 16. Referring first to FIG. 23, the dock slats 14 are provided with an internal steel frame 110 and the vehicle slats 16 are provided with a similar internal steel frame 112. The steel frames 110, 112 are connected to the conveyor slats 14, 16 by nut and bolt assemblies 114, 116. Tubular frame 110 houses a lock member or hook 118. As best shown by FIGS. 32, 33, hook member 118 includes an inner end portion 120, an outer end portion 122, and a narrow connecting portion 124. Inner end portion 120 includes a pair of slanted openings 126 that are provided for receiving slanted guide pins 128 (FIGS. 24–31). FIGS. 24, 25, 27, 28 and 30 show the hook member 118 in its at rest position when it is positioned by gravity down on the bottom portions of the tubular frames 110, 112. Tubular frame 112 houses a pair of abutments 130. The abutments 130 are welded to upper end portions of the tubular frame 112, in laterally spaced apart positions. There is a longitudinal space between the abutments 130 through which the narrow central portion 124 of the hook member 118 extends. A beam 132 that is mounted to be raised and lowered in any suitable fashion is positioned between the end portions of conveyor slats 14 which include the hook members 118. FIGS. 21, 26, 29 and 31 show the beam 132 in its raised position. FIGS. 22, 25, 28 and 30 show it in its lowered position. Beam 132 includes a lifting bar 134 for each hook member 118. When the lifting beam 132 is raised, the bars 134 extend upwardly against central lower surface portions of the hook members 118. This is best shown by FIG. 31. As the bars 134 move upwardly, they contact the hook members 114 and raise them upwardly. This moves the hook surfaces 136 (FIGS. 24, 27 and 33) into contact with inner end surfaces of the abutments 130. The sloping nature of the guide pins 128 causes the hook members 118 to also move endwise towards the conveyor slats 14, causing hook surfaces 136 to move into tight contact with abutment surfaces 138 (FIG. 27). When the lifting bars 134 are fully raised, there is a tight surface-to-surface engagement of hook surfaces 136 with abutment surfaces 138. This pulls the end members 140, 142 on the conveyor slats 14, 16 into tight abutting contact.

FIGS. 34–40 disclose a mechanism for coupling the drive units of the dock conveyor to transverse drive beams that are in the vehicle conveyor. Referring to FIGS. 34 and 35, the drive mechanism for the dock conveyor 150 comprises three transverse drive beams 152, 154, 156, each connected to a separate linear hydraulic drive unit 158. The transverse drive beams 152, 154, 156 and the drive units 158 may be basically like the drive beams and drive units disclosed by FIGS. 32–38 of the aforementioned U.S. Pat. No. 5,605,221. For that reason, there is no need to describe the operation of the conveyor in any detail. The operation is very well described in U.S. Pat. No. 5,605,221. In accordance with an aspect of the present invention, the tubular extensions 160 on the drive units 158 house a mechanism used for coupling the drive units 158 to corresponding drive rods that are a part of the trailer conveyor 162. One of these drive rods is designated 164 in FIGS. 34–36. The trailer conveyor includes three transverse drive beams 166, 168, 170, one for its three sets of conveyor slats. Each transverse drive beam 166, 168, 170 is connected to a separate longitudinal drive rod 164. The drive rods 164 are all alike and so only one of them is illustrated.

The coupling mechanism carried by the tube 160 includes an end housing 172 in which expandable/contractible jaws 174 of a clamp mechanism are housed. The inner ends of the jaws 174 include end portions that are disposed within recesses formed within a member 176 that is secured to the end of a positioning rod 178. FIGS. 37 and 38 show positioning rod 178 in an extended position. In this position the jaws 174 are moved outwardly into, and held in, an open, ball receiving position. Each set of jaws 174 is adapted to receive a ball member 180 that is at the end of its drive rod 164. FIG. 37 shows a drive rod 164 and a ball member 180 spaced axially from an open set of jaws 174. FIG. 38 shows the end portion 160 of the drive unit moved towards the ball 180, to place the ball 180 inside of the open jaws 174. After the ball 180 is within the open jaws 174, the positioning rod 178 is retracted for the purpose of pulling the jaws 174 axially into the housing 172. Outer surface portions 184 of the jaws 174 contact and are guided by a conical inner surface 182 of the housing 172. As shown by FIGS. 39 and 40, when the positioning rod 178 is retracted further, the jaw members are influenced by the conical interior of the housing 172 into a closed position about the ball member 180. The conical inner surface 182 of the housing 172, and the conical outer surface portions 184 of the jaws 174, function to squeeze the jaws 174 tightly about the ball 180. When the positioning member 178 is fully retracted, such as shown by FIG. 40, the end portion 160 of the drive unit 158 is firmly secured to the drive rod 164 and they function as if they were one member. Then, the drive mechanism can be operated in the manner disclosed in U.S. Pat. No. 5,605,221 and this will cause the dock conveyor 150 and the vehicle conveyor 162 to operate together. They can be used together for moving a load from the dock conveyor onto the vehicle conveyor or from the vehicle conveyor onto the dock conveyor.

FIG. 35 shows a conduit 190 leading from a fluid manifold 192 to a working chamber 194 inside of tubular extension 160. A tubular bearing 196 is provided inside of tubular extension 160 and a tubular housing 198 for the positioning rod 178 extends through the bearing 196. Member 198 includes an end portion 200 that contacts a spring 202. Spring 202 is positioned between a divider wall 204 and the end portion 200. Spring 202 is normally extended and normally biases the tube 198 and the positioning rod 178 into the position shown by FIGS. 37 and 38. The divider wall 204 and the bearing 196 seal the working chamber 194. Thus, when fluid is introduced into the working chamber 194, the member 200 is moved to the left, as illustrated, against the spring 202. The spring 202 is compressed and the positioning rod 178 moves to pull the clamp jaws 174 into the housing 172.

FIG. 36 shows a series of tubular bearings 206 for guiding the drive tube 164. The tubular bearings 206 may be substantially like the tubular bearings shown by FIG. 35 of U.S. Pat. No. 5,605,221. FIG. 36 also shows snap-on plastic bearings 208 for the floor slats and show connectors 210 on the transverse drive beams 166, 168, 170 fit up inside of the conveyor slats and are used for connecting the conveyor slats to the transverse drive beams 166, 168, 170. These connectors 210 are like the connectors 234 shown by FIG. 33 of U.S. Pat. No. 5,605,221.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A system of moving cargo, comprising:
   a dock;
   a powered, first reciprocating slat conveyor on said dock, including a plurality of side-by-side conveyor slats, each mounted for independent longitudinal movement;
   a vehicle;
   a passive, second reciprocating slat conveyor on said vehicle, positionable endwise of the powered, first reciprocating slat conveyor, and including a plurality of side-by-side conveyor slats, each mounted for independent longitudinal movement;
   a drive mechanism connected to the powered, first reciprocating slat conveyor for moving its conveyor slats in one longitudinal direction, for conveying a load, and returning the slats in the opposite longitudinal direction; and
   detachable coupler means for coupling the powered, first reciprocating slat conveyor to the passive, second reciprocating slat conveyor so that when the drive mechanism is operated it will move the conveyor slats for both conveyors together in said one longitudinal direction, for conveying a load, and will return the conveyor slats of both conveyors together in the opposite longitudinal direction.

2. The system of claim 1, wherein the detachable coupler means directly connects end portions of at least some of the conveyor slats of the powered, first reciprocating slat conveyor to end portions of at least some of the conveyor slats of the passive, second reciprocating slat conveyor.

3. The system of claim 1, wherein the powered, first reciprocating slat conveyor and the passive, second reciprocating slat conveyor each has at least three sets of slats and at least one group of one conveyor slat from each set, wherein each conveyor comprises a plurality of transverse drive beams, one for each set of conveyor slats, wherein each said transverse drive beam is connected to its set of conveyor slats, and wherein said detachable coupler means detachably connects the transverse drive beams of the passive, second reciprocating slat conveyor to the transverse drive beams of the powered, first reciprocating slat conveyor.

4. The system of claim 3, wherein the detachable coupler means connects one conveyor slat from each set of conveyor slats in the passive, second reciprocating slat conveyor to a corresponding conveyor slat in the powered, first reciprocating slat conveyor.

5. The system of claim 3, wherein the detachable coupler means connects the transverse drive beams of the powered, first reciprocating slat conveyor, each to a conveyor slat of the passive, second reciprocating slat conveyor that is connected to a corresponding transverse drive beam of the passive, second reciprocating slat conveyor.

6. The system of claim 1, wherein the detachable coupler means comprises a first coupler element on a conveyor slat of the powered, first reciprocating slat conveyor, and a second coupler element on a corresponding conveyor slat of the passive, second reciprocating slat conveyor that is engageable with the first coupler element for coupling the two conveyor slats together.

7. The system of claim 1, wherein the detachable coupler means comprises an end member on a conveyor slat of one of the reciprocating slat conveyors, and a piston carried by a corresponding conveyor slat of the other reciprocating slat conveyor, said end member including longitudinal tunnel opening and an inner radial surface bordering the tunnel opening, and said piston having a first position in which it is movable longitudinal into and through the tunnel opening in the end member, and when extended is rotatable into a second position, and said piston having a hook at its outer end having an inner, radial lock surface that is movable by rotation of the piston from its first into its second position, into a lock position in which it confronts the inner surface of the end member and prevents retraction of the piston while it is in its second position, thereby coupling the two conveyor slats together.

8. The system of claim 7, wherein the piston includes a rotatable piston head and said system includes fluid means for rotating the piston head and said piston and said hook.

9. The system of claim 7, wherein one of the conveyor slats includes a recess at its end and the other conveyor slat includes a projection that fits within the recess, and wherein when the piston is in its second position and its radial lock surface is against the inner radial surface of the end member, such projection is within said recess.

10. The system of claim 3, wherein the drive mechanism includes a separate hydraulic piston-cylinder drive unit for each drive beam of the powered, first reciprocating slat conveyor, each said piston-cylinder drive unit having a fixed portion that is anchored to a frame and a movable portion that is connected to its transverse drive beam and moves back and forth longitudinally relative to the fixed portion of the drive unit, and a coupler element connected to the movable portion of the piston-cylinder drive unit, and wherein the passive, second reciprocating slat conveyor includes a plurality of longitudinally extending drive rods, one for each transverse drive beam of the passive, second reciprocating slat conveyor, each said drive rod being connected to its transverse drive beam, and each having a coupler element that is connectable to the coupler element on the movable portion of a corresponding piston-cylinder drive unit, whereby when the coupler element on the movable portion of each piston-cylinder drive unit is connected to the coupler element on the corresponding drive rod, each transverse drive beam of the passive, second reciprocating slat conveyor is connected to a corresponding piston-cylinder drive unit of the powered, first reciprocating slat conveyor.

11. The system of claim 10, wherein the coupler elements on the ends of the drive rods are in the nature of a ball and the coupler elements that are connected to the movable portion of the piston-cylinder drive units are clamps which are selectively operable to clamp onto or release the balls.

12. The system of claim 11, wherein each said clamp is on an outer end of a longitudinally movable control rod, and the system includes means for extending and retracting the control rod, said clamp opening and releasing its ball when the control rod is extended, and closing and engaging its ball when the control rod is retracted.

13. The system of tandem, reciprocating slat conveyors, comprising:

a powered, first reciprocating slat conveyor including a plurality of side-by-side conveyor slats, each mounted for independent longitudinal movement;

a passive, second reciprocating slat conveyor positionable endwise of the powered, first reciprocating slat conveyor, and including a plurality of side-by-side conveyor slats, each mounted for independent longitudinal movement;

a drive mechanism connected to the powered, first reciprocating slat conveyor for moving its conveyor slats in one longitudinal direction, for conveying a load, and returning the slats in the opposite longitudinal direction; and detachable coupler means for coupling the powered, first reciprocating slat conveyor to the passive, second reciprocating slat conveyor, so that when the drive mechanism is operated it will move the conveyor slats for both conveyors together in said one longitudinal direction, for conveying a load, and will return the conveyor slats of both conveyors together in the opposite longitudinal direction, said coupler means including a first end member at the end of each conveyor slat of the powered conveyor and a second end member at a confronting end of a related conveyor slat of the passive conveyor, one of said end members including a socket and the other said end member including a projection that snugly fits within the socket and said detachable coupler means further includes a hook member that extends longitudinally from one of the conveyor slats through both end members and hooks onto an inner radial surface portion of the end member of the second conveyor slat, and pulls the two conveyor slats together and pulls the projection into the socket.

14. The system of claim 13, wherein the hook member is extendable axially through a tunnel opening in the second end member and is then rotatable into a position where it engages the radial inner surface of the second end member.

15. The system of claim 14, wherein the rotatable piston and the hook member are also movable axially.

16. The system of claim 15, further comprising fluid means for moving the hook member axially against the radial inner surface of the second end member after the hook member has been rotated into a position which it confronts the radial inner surface of the second end member.

17. A system of tandem, reciprocating slat conveyors, comprising:

a powered, first reciprocating slat conveyor including a plurality of side-by-side conveyor slats, each mounted for independent longitudinal movement;

a passive, second reciprocating slat conveyor positionable endwise of the powered, first reciprocating slat conveyor, and including a plurality of side-by-side conveyor slats, each mounted for independent longitudinal movement;

a drive mechanism connected to the powered, first reciprocating slat conveyor for moving its conveyor slats in one longitudinal direction, for conveying a load, and returning the slats in the opposite longitudinal direction; and detachable coupler means for coupling the powered, first reciprocating slat conveyor to the passive, second reciprocating slat conveyor so that when the drive mechanism is operated it will move the conveyor slats for both conveyors together in said one longitudinal direction, for conveying a load, and will return the conveyor slats of both conveyors together in the opposite longitudinal direction, said detachable coupler means comprising a hook member carried by at least some of the conveyor slats of one of the conveyors and abutment means carried by conveyor slat of the other conveyor, said hook member projecting from its conveyor slat and projectable into the end of the confronting conveyor slat of the other conveyor, below the abutment means, and means for lifting the hook member into a position of engagement with the abutment means.

* * * * *